United States Patent [19]

Nakamura et al.

[11] Patent Number: 4,868,674
[45] Date of Patent: Sep. 19, 1989

[54] RECORDING APPARATUS WITH PLURAL SHEET SUPPLY AND SELECTIVE CONVEYANCE

[75] Inventors: Mitsunori Nakamura, Kawasaki; Kenkichi Sakuragi, Tokyo; Keizo Sasai, Yokohama; Akio Ohkubo, Tokyo, all of Japan

[73] Assignee: Canon Kabushiki Kaisha, Tokyo, Japan

[21] Appl. No.: 84,080

[22] Filed: Aug. 11, 1987

[30] Foreign Application Priority Data

Aug. 22, 1986 [JP] Japan .................................. 61-195194
Jul. 8, 1987 [JP] Japan .................................. 62-170453
Jul. 8, 1987 [JP] Japan .................................. 62-170454
Jul. 8, 1987 [JP] Japan .................................. 62-170457

[51] Int. Cl.⁴ ........................ H04N 1/23; G01D 15/24
[52] U.S. Cl. .................................. 358/296; 358/304; 346/136
[58] Field of Search ............. 358/296, 304; 355/3 SH, 355/14 SH; 346/150, 136

[56] References Cited

U.S. PATENT DOCUMENTS 4,604,632 8/1986 Matsumoto ........................... 346/24

FOREIGN PATENT DOCUMENTS

| 44-12210 | 3/1969 | Japan . | |
|---|---|---|---|
| 50-7928 | 3/1975 | Japan . | |
| 56-28556 | 3/1981 | Japan | 358/304 |
| 58-10957 | 1/1983 | Japan | 358/296 |
| 58-116863 | 7/1983 | Japan | 358/304 |
| 59-40759 | 3/1984 | Japan . | |
| 59-216370 | 12/1984 | Japan | 358/296 |
| 216370 | 12/1984 | Japan | 358/296 |
| 46165 | 3/1985 | Japan | 358/304 |
| 60-46165 | 3/1985 | Japan | 358/304 |
| 60-229467 | 11/1985 | Japan | 358/304 |
| 60-193746 | 12/1985 | Japan . | |

*Primary Examiner*—E. A. Goldberg
*Assistant Examiner*—Scott A. Rogers
*Attorney, Agent, or Firm*—Fitzpatrick, Cella, Harper & Scinto

[57] ABSTRACT

A recording apparatus adapted to accommodate first and second recording sheets rolled into rolls, selectively convey one of the first and second recording sheets to a recording section having a recording head, and record an image in accordance with image information on the selected recording sheet. The apparatus is capable of initializing the positions of the leading ends of the recording sheets in such a manner that they are positioned at a predetermined stand-by position. The apparatus may be adapted to display a message requesting the initialization after a cover over the recording sheets has been closed. Alternatively, the apparatus may have sensors for detecting the recording sheets and may be adapted to perform the initialization on the basis of the outputs of the sensors by cutting portions of the recording sheets at the leading ends thereof alternately. The apparatus may also have a register for storing data on a power supply turned-off condition, a cover-opening condition, or a condition in which a recording operation is stopped during recording, and may be adapted to perform the initialization when data on one of the conditions is stored at the start of a recording operation and erase the stored data after the initialization.

31 Claims, 19 Drawing Sheets

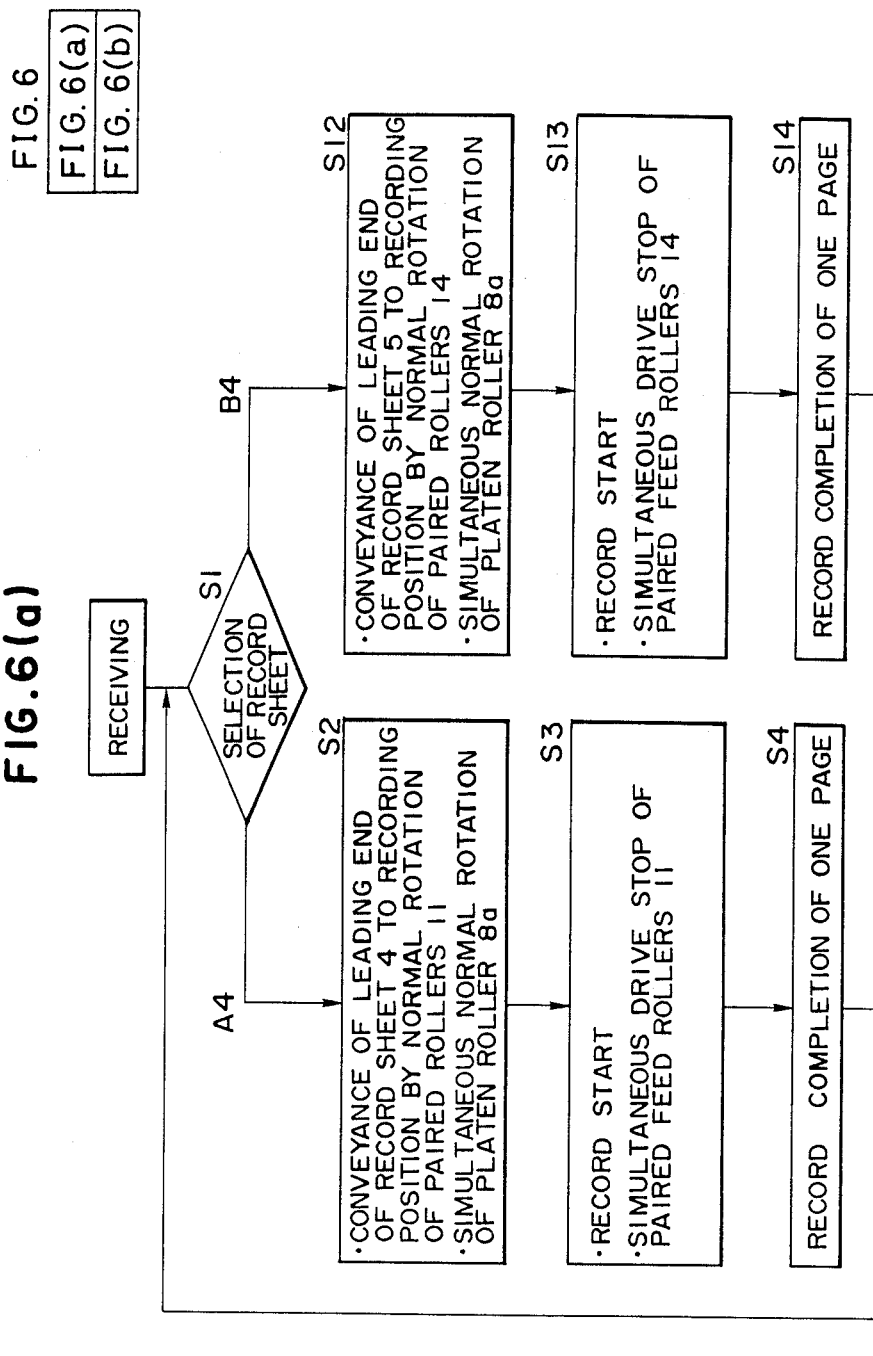

RECORDING APPARATUS WITH PLURAL SHEET SUPPLY AND SELECTIVE CONVEYANCE

BACKGROUND OF THE INVENTION

1. Field of the Invention

The present invention relates to a recording apparatus such as a facsimile apparatus, an electronic typewriter, a personal computer, a printer or a word processor, and more particularly, to a recording apparatus in which a plurality of rolled recording sheets are employed.

2. Related Background Art

Conventional recording apparatuses such as facsimile apparatuses or printers of the desk-top type accommodate a recording sheet of predetermined size rolled into a single sheet roll, and are adapted to record the received image information successively as the recording sheet is rolled out.

Conventional recording apparatuses of the so-called double-roll type are capable of accommodating two sheet rolls. Apparatuses of this type are the large console type of recording apparatus. Therefore, they have a complicated drive power transmission mechanism and provide a complicated method for setting recording sheets, thus being difficult to use.

In the conventional recording apparatuses described above, when one recording sheet has been replaced with another, a part of the new recording sheet is cut off by a manual operation conducted by the operator so that the leading end of the recording sheet is correctly positioned. However, if the operator forgets to perform this manual cutting operation, the leading end of the recording sheet is often left in a stand-by condition at an incorrect position position. This causes problems involving a risk that an excessively large blank area may be left at the leading end of a recorded and cut sheet, or conversely that a portion of the image information to be recorded at the leading end of a recording sheet may never be recorded.

In the case where two recording sheet rolls are accommodated, the problems described above may be caused in the event that only one of the recording sheet rolls is subjected to the cutting operation, the other recording sheet roll not being subjected to such an operation.

It has been a general practice to perform the following control with a conventional facsimile apparatus employing a single recording sheet roll. A recording head records image on a recording sheet simultaneously as the platen roller conveys the recording sheet. After the recording has been completed, the platen roller rotates to feed the trailing end of the recording sheet to the cutting position of the cutter. The cutter cuts the recording sheet on the rear side of the image recorded on the recording sheet. The platen roller rotates in reverse to rewind the recording sheet, and, when the leading end of the recording sheet reaches the stand-by position, the platen roller stops rotating.

When a recording operation is abnormally stopped during recording due to a cut in the power supply or the like, and when recording is to be resumed after the power supply has been turned on, the recording sheet remains at the position at which it abnormally stopped. Hence, the recording is restarted from this position.

However, in an apparatus of the type which has a plurality of rolled recording sheets, and in which one of the recording sheets is selectively employed in a recording, when a recording operation is abnormally stopped and if a different one of the recording sheets is selected at the time of restarting the recording operation after the return of the normal condition, there is the risk that information may not be recorded on the recording sheet on which the information should be recorded. In addition, there is a risk that the recording sheets jam the apparatus.

Further, when a recording apparatus having a plurality of recording sheets is moved from one place to another while the power supply is being turned off, and when a recording operation is to be performed after the is the power supply turned on, since the position of the leading end of the recording sheet within the apparatus may be displaced during the move, this may lead to abnormal recording much the same as in the above-described case. A similar problem may also be caused when the cover over the recording sheets is closed after it has been opened.

SUMMARY OF THE INVENTION

An object of the present invention is to provide a recording apparatus having improved operability.

Another object of the present invention is to provide a recording apparatus capable of positively recording on the recording sheets.

Another object of the present invention is to provide a recording apparatus having a plurality of recording sheet rolls with improved operability.

Another object of the present invention is to provide a recording apparatus capable of accommodating a plurality of recording sheet rolls in a compact manner.

A further object of the present invention is to provide a recording apparatus having a plurality of recording sheet rolls which is capable of automatically cutting the leading ends of the recording sheets in an alternate and successive manner so that the leading ends will positively stand-by at the correct positions.

A still further object of the present invention is to provide a recording apparatus having a plurality of recording sheet rolls which is capable of reducing the occurrence of jamming the recording sheets.

According to one aspect of the present invention, there is provided a recording apparatus adapted to accommodate first and second recording sheets rolled into rolls, selectively convey one of the first and second recording sheets to a recording section having a recording head, and record an image in accordance with image information on the selected recording sheet, the recording apparatus being characterized by being capable of initializing the positions of the leading ends of the first and second recording sheets alternately.

According to another aspect of the present invention, there is provided a recording apparatus adapted to accommodate first and second recording sheets rolled into a plurality of rolls, selectively convey one of the first and second recording sheets to a recording section having a recording head, and record an image in accordance with image information on the selected recording sheet, the recording apparatus being characterized by comprising recording sheet detecting sensors for detecting the first and second recording sheets; and initialization means adapted to determine the position of the leading end of each of the recording sheets on the basis of the outputs of the recording sheet detecting sensors, cut off portions of the recording sheets at the leading ends thereof alternately, and initialize the positions of the recording sheets.

According to another aspect of the present invention, there is provided a recording apparatus adapted to accommodate first and second recording sheets rolled into a plurality of rolls, selectively convey one of the first and second recording sheets to a recording section having a recording head, and record an image in accordance with image information on the selected recording sheet, the recording apparatus being characterized by comprising a register for storing data on a condition in which the power supply is turned off, a condition in which a cover is open, or a condition in which a recording operation is stopped during recording;

initialization means adapted to initialize the positions of the leading ends of the recording sheets when data on one of the conditions is stored in the register at the start of a recording operation; and erasing means adapted to erase the stored data on the conditions from the register after the positions of the leading ends of the recording sheets have been initialized.

BRIEF DESCRIPTION OF THE DRAWINGS

FIGS. 9, 10-1, and 10-2 are flowcharts for operation of the apparatus in accordance with the embodiment shown in FIG. 8;

FIGS. 14-1, 14-2, 14-3, 14-4, and 14-5 are views corresponding to FIG. 11, showing conditions in which the recording sheet detecting sensor 39a is detecting "black" while the recording sheet detecting sensor 39b is detecting "white";

FIGS. 15-1, 15-2, 15-3, 15-4, and 15-5 are views corresponding to FIG. 11, showing conditions in which the recording sheet detecting sensor 39a is detecting "white" while the recording sheet detecting sensor 39b is detecting "black"

DETAILED DESCRIPTION OF THE PREFERRED EMBODIMENTS

The present invention will now be described with respect to embodiments thereof with reference to the drawings.

An embodiment as given below provides a recording apparatus adapted to accommodate first and second recording sheets rolled into rolls, selectively convey one of the first and second recording sheets to a recording section having a recording head, and record an image in accordance with image information on the selected recording sheet. This recording apparatus is capable of initializing by a one-time operation of a button the positions of the leading ends of the first and second recording sheets alternately so that the leading end of each of the recording sheets will stand-by at correct positions.

A recording apparatus which is, for example, a facsimile apparatus and to which the present invention is applied will be described with reference to FIGS. 1 to 7.

Figure 1:
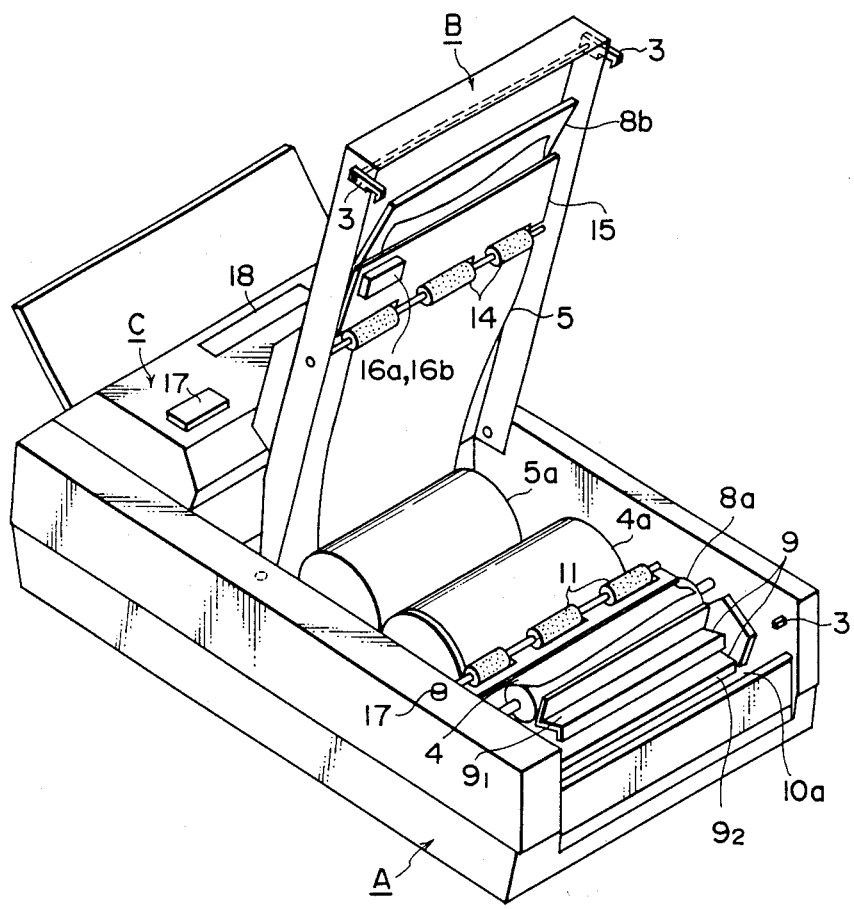
FIG. 1 is a perspective view of a facsimile apparatus to which an embodiment of the present invention is applied, showing the apparatus in a condition in which a first casing A and a second casing B are in an opened condition.
Figure 2:
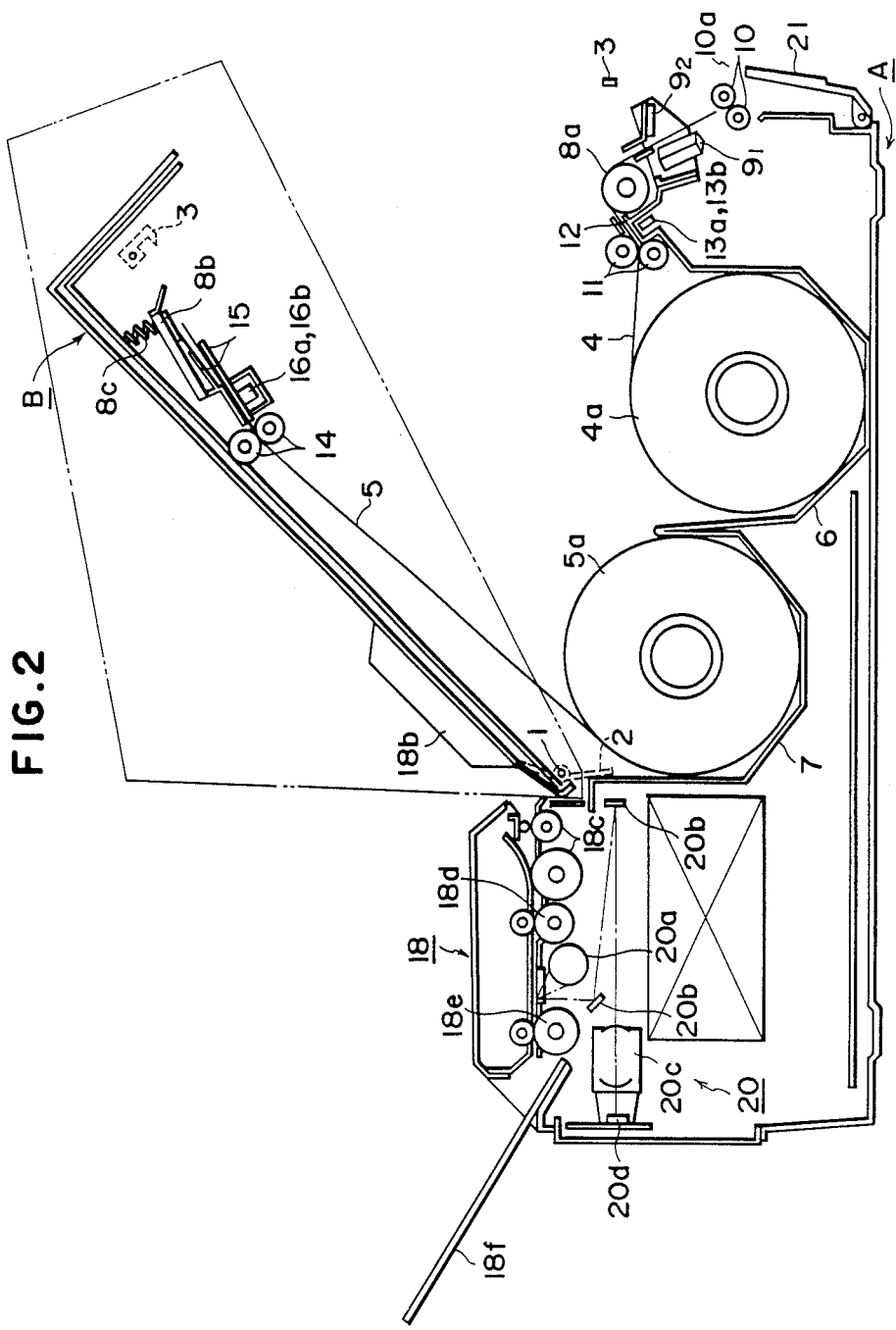
FIG. 2 is a sectional view of the apparatus shown in FIG. 1, showing in particular a recording section thereof.
Figure 3:
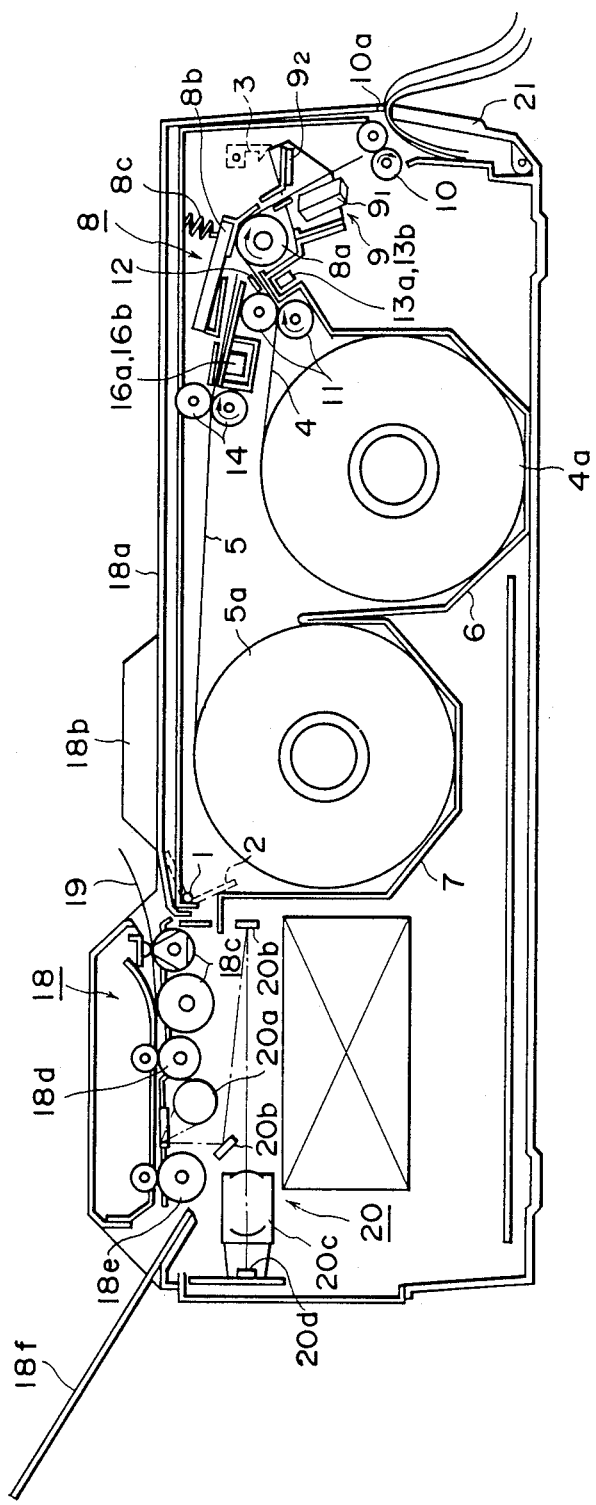
FIG. 3 is a sectional view similar to FIG. 2, showing the apparatus in a condition in which the casings are in the closed condition.
Figure 4:
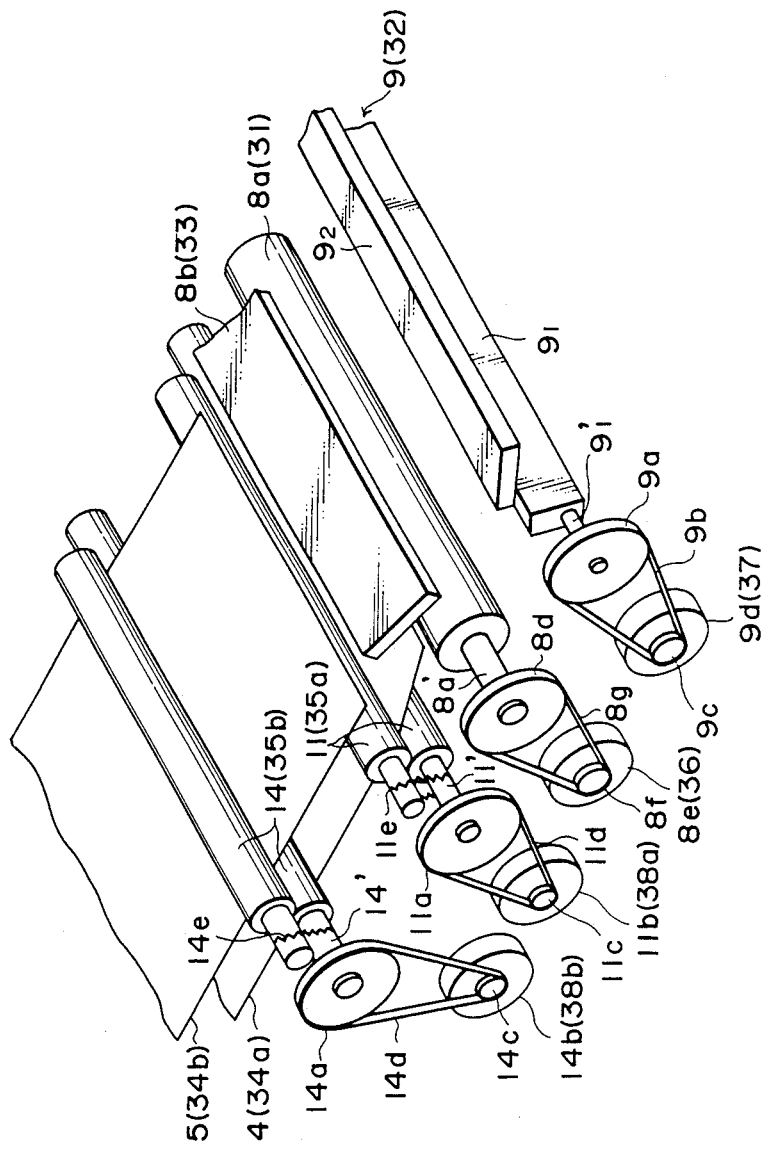
FIG. 4 is a perspective view of a drive system of the apparatus shown in FIG. 1.
Figure 5:
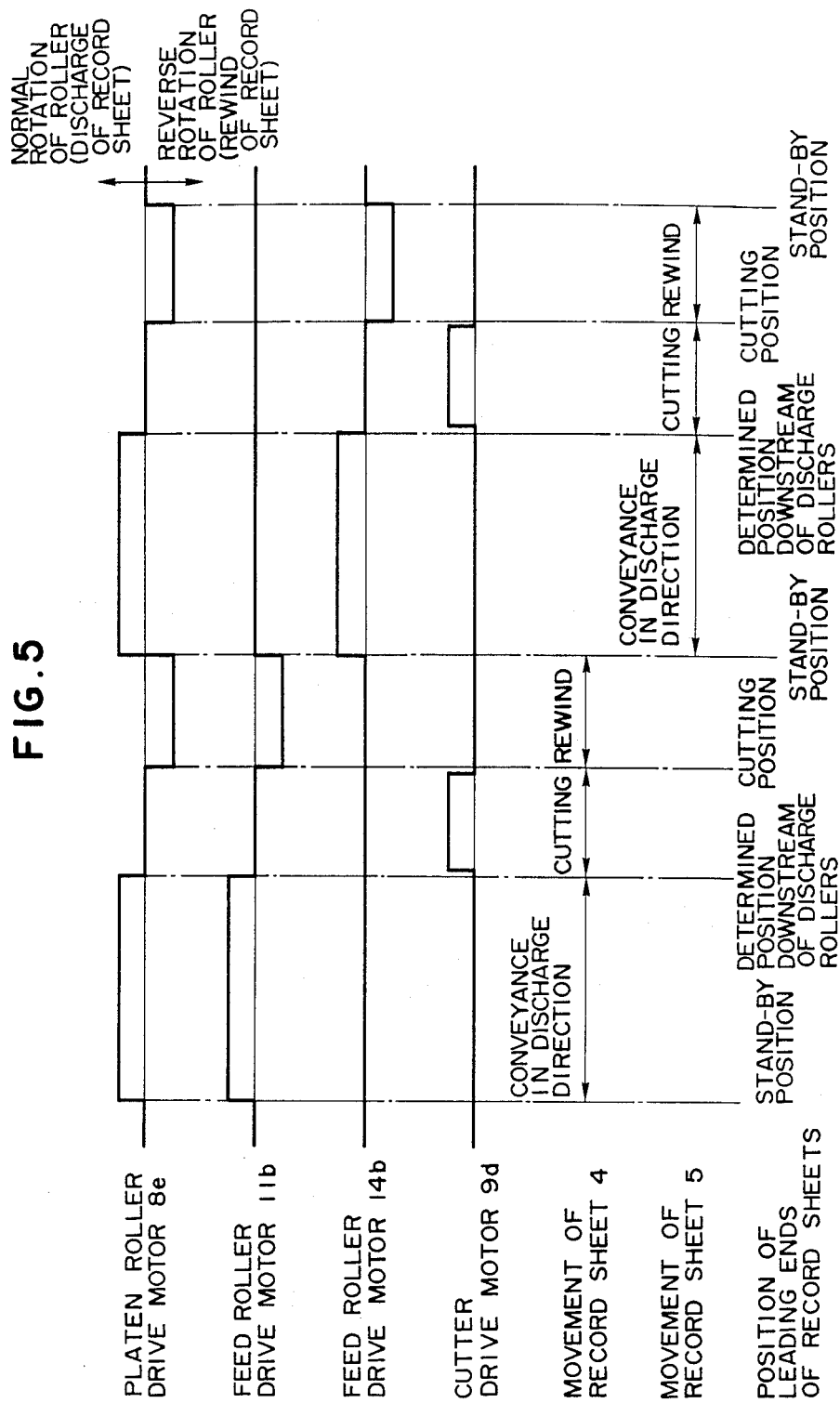
FIG. 5 is a timing chart showing the manner in which drive motors of the apparatus shown in FIG. 1 are driven.
Figure 6B:
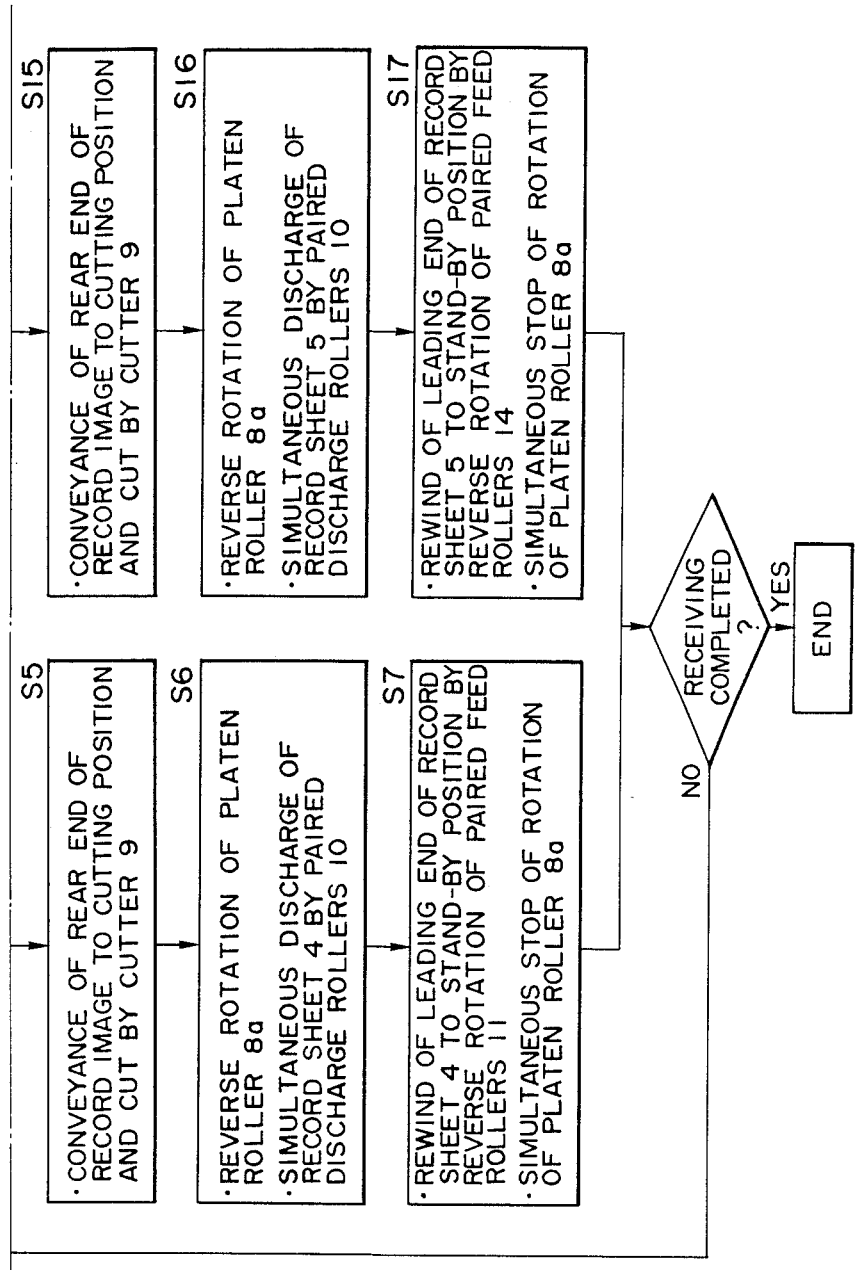
FIG. 6 is a flowchart for recording a received image with the apparatus shown in FIG. 1.
Figure 7:
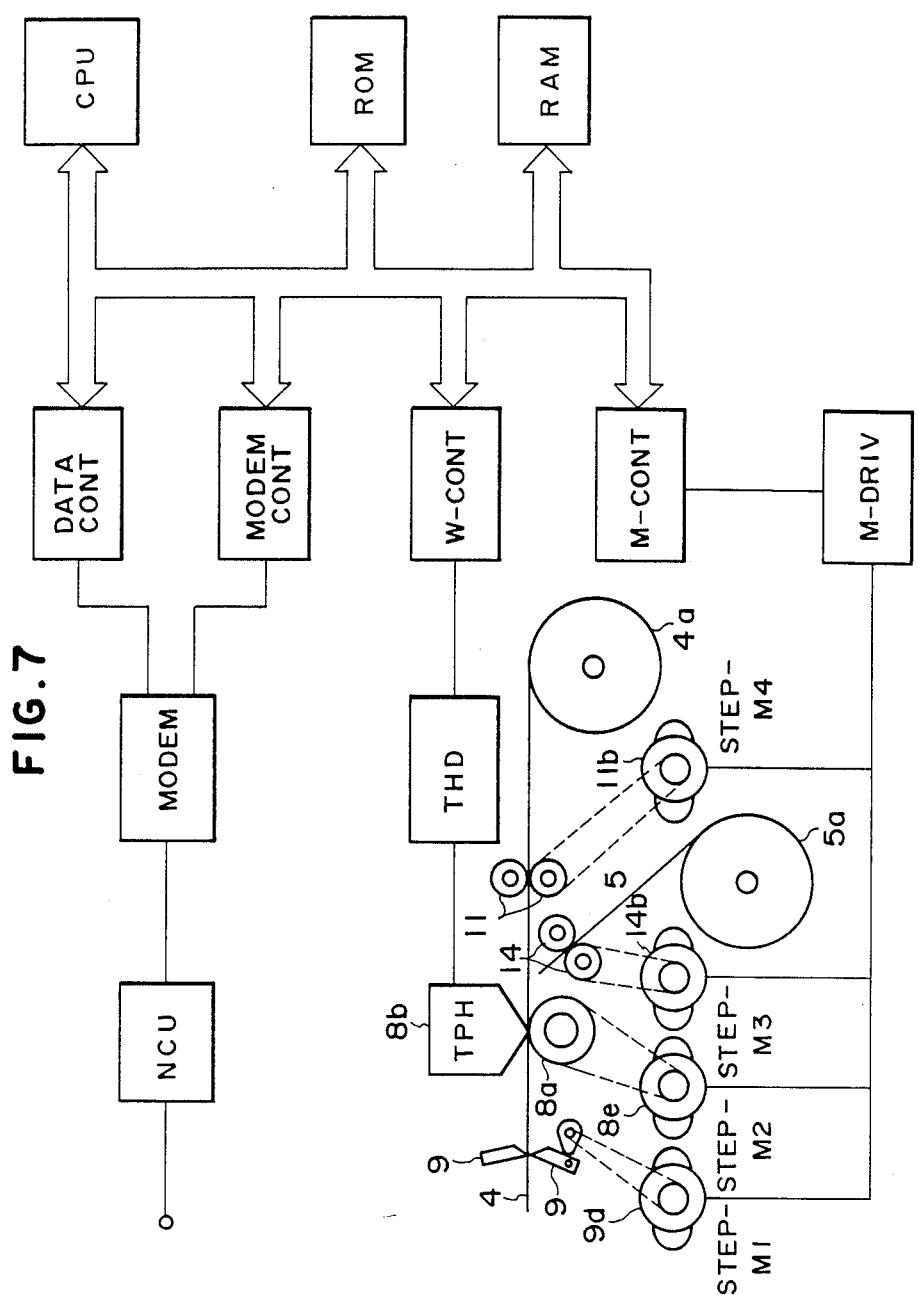
FIG. 7 is a block diagram of the periphery of a control section, of the apparatus shown in FIG. 1.

FIG. 1 is a perspective view of the facsimile apparatus showing a first casing A and a second casing B are in an opened condition. FIG. 2 is a sectional view of the apparatus, showing in particular a recording section of the apparatus. FIG. 3 is a sectional view similar to FIG. 2, showing the casings A and B in the closed condition. FIG. 4 is a perspective view of a drive system of the apparatus. FIG. 5 is a timing chart showing the manner in which drive motors are driven. FIG. 6 is a flowchart for recording a received image. FIG. 7 is a block diagram of the periphery of a control section.

In these figures, the apparatus has a first casing A serving as a main body of the apparatus, and a second casing B serving as a cover of the main body and pivotally supported by a shaft 1 in such a manner as to be openable by rotating around the shaft 1. A spring 2 is provided on the shaft 1 which serves as the focus of the rotation. Two pairs of hooks 3, each pair consisting of hooks engageable with each other, are provided at the openable ends of the casings A and B so that, when the hooks 3 are disengaged, the second casing B is moved away the first casing A by urging force of the spring 2.

The first casing A has two pitfall-type roll holders 6 and 7 disposed side by side for individually receiving therein recording sheets 4 and 5 rolled into sheet rolls 4a and 5a, respectively, of different sizes. One of the recording sheets 4 and 5 which are received in the respective roll holders 6 and 7 is conveyed to a recording section, generally denoted at 8, by a selection signal from a control section shown in the block diagram in FIG. 7. A predetermined image is recorded on this selected recording sheet by the recording section 8, and a portion of the recording sheet which carries the thus recorded image is cut off on the rear side of the image by a cutter 9 disposed on the first casing A and comprising a rotary blade $9_1$ and a stationary blade $9_2$. The thus cut off portion of the recording sheet is discharged out of the apparatus by paired discharge rollers 10 which are also disposed on the first casing A.

The recording section 8 mainly comprises a platen roller 8a for conveying the recording sheet 4 or 5 at a constant speed, and a recording head 8b of the line-type which is capable of coming into pressure-contact with the platen roller 8a as shown in FIG. 3 to heat the recording sheet formed of a heat-sensitive sheet in accordance with image information. The arrangement of the apparatus is such that the platen roller 8a is provided on the first casing A while the recording head 8b is provided on the second casing B, and, when the casings A and B are brought into the closed condition, the platen roller 8a and the recording head 8b come into pressure contact with each other by an urging spring 8c provided on the reverse surface of the recording head 8b.

Each of the recording sheets 4 and 5 is conveyed to the recording section 8 by paired feed rollers forming the feed members. Paired feed rollers 11 are provided between the platen roller 8a and the roll holder 6 (hereinafter referred to as "the first roll holder") that is closer to the recording section 8 for conveying the recording sheet 4 received in this first roll holder 6. A sheet detecting sensor 13a as well as a sheet width detecting sensor 13b are provided between these paired feed rollers 11 and the platen roller 8a through a sheet guide 12. On the second casing B, paired feed rollers 14 are provided between the recording head 8b and the roll holder 7 (hereinafter referred to as "the second roll holder") that is away from the recording section 8 for conveying the recording sheet 5 received in the second roll holder 7. A sheet presence detecting sensor 16a and a sheet width detecting sensor 16b are provided between these paired feed rollers 14 and the recording head 8b through a sheet guide 15.

Drive power for the platen roller 8a, the cutter 9, and the paired feed rollers 11 and 14 are transmitted thereto independently from individual drive motors 8e, 9d, 11b, and 14b. More specifically, as shown in FIG. 4, pulleys 8d, 9a, 11a, and 14a are provided on the respective one ends of a shaft 8a, of the platen roller 8a, a shaft $9_1'$ of the rotary blade $9_1$ of the cutter 9, a shaft 11' of the paired feed roller 11, and a shaft 14' of the paired feed roller 14, while the drive motors 8e, 9d, 11b, and 14b have respective pulleys 8f, 9c, 11c, and 14c. Belts 8g, 9b, 11d, and 14d are disposed respectively around the pulleys 8d and 8f, the pulleys 9a and 9c, the pulleys 11a and 11c, and the pulleys 14a and 14c, thereby enabling independent transmission of drive power. A control unit (not shown in FIG. 4) for controlling the driving of these drive motors 8e, 9d, 11b, and 14b is provided on the first casing A. Further as shown in FIG. 4, each of the paired feed rollers 11 and 14 are provided with a spring 11e or 14e so as to keep the rollers in pressure contact and thereby to allow one of the rollers to rotate following rotation of the other.

An operation section C is provided with a manual cut button 17 and a display unit 18. The display unit 18 is adapted to display various types of information such as operation procedures, error indications, and transmitting/receiving indications.

Reference numeral 18 shown in FIGS. 2 and 3 denotes an original sheet conveyance system. The arrangement of this system is as given below. Original sheets are placed on an original sheet table 18a formed on the upper surface of the second casing B, and are guided by side guides 18b on both sides. The sheets are then successively separated by separation rollers 18c. The original sheets (only one of which is denoted by 19) are conveyed successively by conveyance rollers 18d at a constant speed to the left side as viewed in these figures, and are discharged by discharge rollers 18e to a discharge tray 18f.

Reference numeral 20 shown in FIGS. 2 and 3 denotes an original sheet reading system. The arrangement of this system is as given below. While an original sheet 19 is being conveyed, light is radiated thereon from a light source 20a of the original sheet reading system 20. The reflected ray reaches an image reading element 20d through a plurality of mirrors 20b and lenses 20c so that an image carried by the original sheet is read and the image information is transmitted to a predetermined recording system.

The operation of the recording apparatus constructed as described above will now be described.

When it is necessary to set sheet rolls, the hooks 3 are disengaged and the second casing B is opened upwardly. A sheet roll 4a which is, for instance, of A-4 size is accommodated within the first holder 6 which is provided forwardly in the direction in which the recording sheet is discharged. The forward end of the sheet is passed through the gap between the paired feed rollers 11 and is brought to the vicinity of the sheet guide 12. Similarly, a sheet roll 5a which is, for instance, of B-4 size is accommodated within the second holder 7 which is provided backwardly in the direction in which the recording sheet is discharged. The forward end of the sheet is passed through the gap between the paired feed rollers 14 and is brought to the vicinity of the sheet guide 15.

After the recording sheets have been set in the above-described manner, when the second casing B is closed, the display 18 unit displays a message requesting a manual cutting operation. When the manual cut button 17 is pressed in response to the indication, a manual cutting operation starts.

This manual cutting operation will now be described. The paired feed rollers 11 and the platen roller 8a rotate in the direction indicated by the arrows shown in FIG. 3 so as to convey a portion of the recording sheet 4 at the forward end thereof to the paired discharge rollers 10 through the gap between the blades of the cutter 9. The cutter 9 cuts off this portion, and the thus cut-off portion is discharged from the discharge port 10a to the outside of the apparatus. The platen roller 8a and the paired feed rollers 11 are then rotated reversely or in the opposite direction so as to rewind the recording sheet in such a manner that the leading end thereof is positioned in the vicinity of the tip of the sheet guide 12 and is thus brought into a stand-by condition. After the cutting of the recording sheet 4 has been completed, the cutting of the recording sheet 5 is successively performed. That is, the paired feed rollers 14, the platen roller 8a, and the cutter 9 are automatically operated in a similar manner so as to cut a forward portion of the recording sheet 5 and rewind the recording sheet in such a manner that the leading end thereof is positioned in the vicinity of the sheet guide 15 and is thus brought into a stand-by condition.

In order to perform the above-mentioned cutting operation, the drive motors 8e, 11b, and 14b for the rollers and the drive motor 9d for the cutter 9 are operated at the timings shown in FIG. 5. That is, the platen roller drive motor 8e and the feed roller drive motor 11b simultaneously start rotating, and, when the recording sheet 4 has been conveyed by a predetermined mount, the drive motors 8e and 11b are stopped. The cutter 9 is then operated by rotation of the cutter drive motor 9d, thereby cutting the recording sheet 4. When the cutting is completed, rotation of the cutter drive motor 9d stops. The drive motors 8e and 11b are simultaneously rotated in the reverse direction this time, thereby rewinding the recording sheet 4 until the leading end thereof is positioned at a predetermined stand-by position. When the leading end has reached the stand-by position, rotation of the drive motors 8e and 11b stops, thereby completing the cutting operation with respect to the recording sheet 4. A cutting operation with respect to the recording sheet 5 is performed successively by causing the drive motors 8e, 14b, and 9d to operate in a similar fashion to what is described above. In this way, a series of manual cutting operations is completed.

Although the platen roller 8a and the paired feed rollers 11 or 14 are rotated simultaneously when the recording sheet 4 or 5 is conveyed in the discharge direction, this is not limitative. Alternatively, the platen roller 8a may be kept stopped until the forward end of the recording sheet is conveyed from the stand-by position to the recording section by the paired feed rollers 11 or 14. Also while the recording sheet is rewound after the cutting for the purpose of positioning the leading end at the stand-by position, the platen roller 8a may be stopped at the moment when the leading end of the recording sheet has passed the recording section.

By virtue of effecting the manual cutting operation described above, the leading ends of the recording sheets 4 and 5 are cut linearly, and are positioned accurately at the stand-by positions through the control of the amount of rotation of the platen roller 8a and the paired feed rollers 11 and 14.

Next, a recording operation will be described with reference to the flowchart shown in FIG. 6. If image information corresponding in size to A-4 size is received (S1), the sheet width detecting sensor 13b detects that the width of the recording sheet 4 is the width of A-4 size, and the drive motor 11b is driven so as to rotate the paired feed rollers 11 in the direction indicated by the arrow shown in FIG. 3, i.e., in the normal direction (S2), thereby conveying the recording sheet 4 to the recording section 8. Simultaneously with this, the drive motor 8e is driven so as to rotate the platen roller 8a in the direction indicated by the arrow shown in FIG. 3.

While the recording sheet 4 is conveyed by the platen roller 8a at a constant speed, the received image information is recorded on the recording sheet 4 by the recording head 8b which generates heat in accordance with the image information (S3).

When the recording of the received image information is completed in the above-described way (S4), the recording sheet 4 is conveyed by the platen roller 8a until the rear end of the recorded image reaches the cutter 9, and the recording sheet 4 is cut at this rear end (S5). A portion of the recording sheet 4 on which the image information has been recorded is discharged by the paired discharge rollers 10 from the discharge port 10a to the outside of the apparatus (S6). The platen roller 8a and the paired feed rollers 11 are rotated in the direction which is opposite to that indicated by the arrow shown in FIG. 3, i.e., rotated in the reverse direction so that the recording sheet 4 is rewound and the leading end thereof is positioned at the stand-by position (S7), thereby completing the recording of the image corresponding in size to A-4 size (S8).

In this embodiment, the devices are driven individually in the above-mentioned processes. This arrangement contrasts with the prior art in which a platen roller and paired feed rollers or a platen roller and a cutter are driven by a single drive motor and which necessitates an operation of changing the direction in which drive power is transmitted by employing elements such as solenoids or the provision of complicated gear trains. The arrangement of the present invention completely eliminates the need for such an operation and provision of such elements, thus considerably reducing the occurrence of error in rotation such as backlash and thereby enabling accurate control of the amount by which the recording sheet 4 is conveyed.

If a received image corresponds in size to B-4 size, the sheet width detecting sensor 16b detects that the recording sheet 5 has the width of B-4 size (S1), and the recording of the B-4 sized image information on the recording sheet 5 is effected by operating the paired feed rollers 14, the recording section 8, and the cutter 9 with respect to the recording sheet 5 in a similar fashion to what is described above (S12 to S17).

Although in this embodiment, the display unit provided in the operational section is used to display a message requesting a manual cutting operation by the operator, a lighting means such as an LED may be provided at a predetermined location on the casing and this may be arranged to continue flashing until a manual cutting operation has been completed.

FIG. 7 is a block diagram of the periphery of the control section. Detailed description has already been given in the specification of Japanese Patent Application No. 114705/1986. The main components are MODEM which is a demodulation unit, DATA CONT which is a transmission data control unit, MODEM CONT which is control unit for the demodulation unit, W-CONT which is a recording control unit, M-CONT which is a motor control unit, a CPU (central processing unit), ROM and RAM which are memories, a TPH (thermal head), and a THD (thermal head driver).

Figure 8:
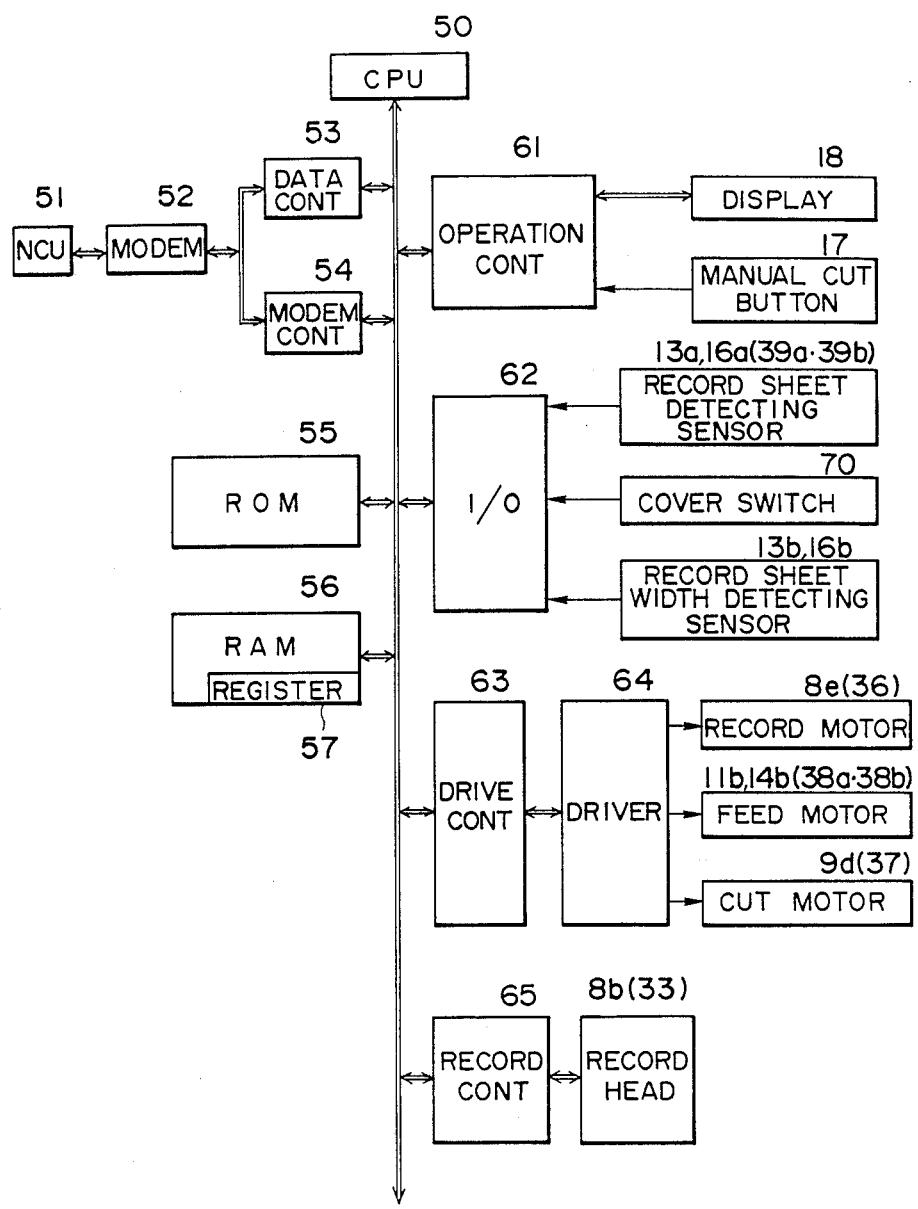
FIG. 8 is a block diagram showing another embodiment of the present invention.
Figure 9:
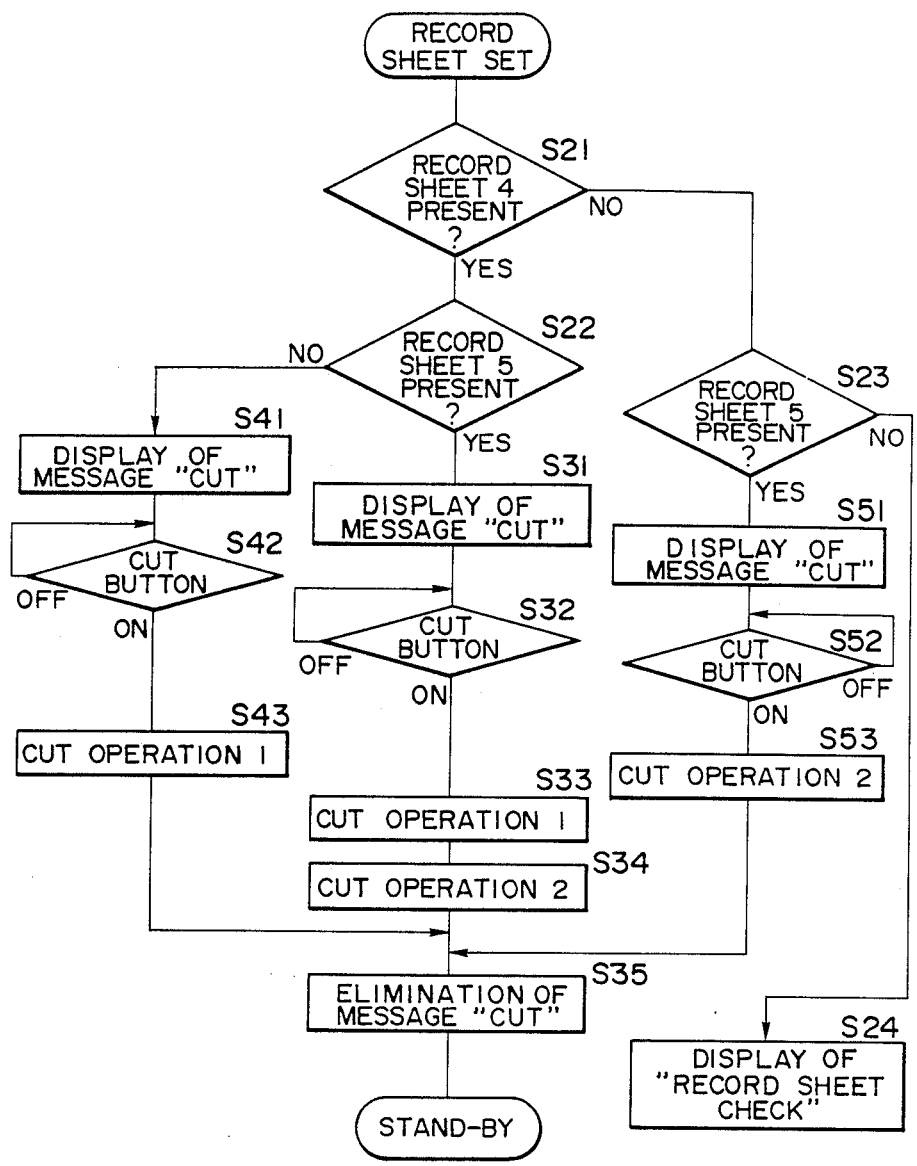

FIG. 8 is a block diagram showing a second embodiment of the present invention.

A recording apparatus to which this embodiment of the present invention is applied has a CPU 50, an NCU (network control unit) 51, MODEM 52, DATA CONT 53, MODEM CONT 54, a ROM 55, a RAM 56, OPERATION CONT 61, I/O 62, DRIVE CONT 63, DRIVER 64, and RECORD CONT 65. The apparatus also has a display unit 18, a manual cut button 17, recording sheet detecting sensors 13a and 16a, recording sheet width detecting sensor 13b and 16b, a recording motor 8e, feed motors 11b and 14b, a cutter motor 9b, and a recording head 8b.

In this embodiment, the CPU 50 acts as an example of a means to initialize the positions of the leading ends of first and second recording sheets 4 and alternately by a one-time operation of a button.

FIG. 9 and FIGS. 10-1 and 10-2 are flowcharts showing operations of the apparatus in accordance with the second embodiment shown in FIG. 8.

When the recording sheets have been set, it is first judged whether or not the recording sheet 4 is present (S21). In this step, the recording sheet detecting sensor 13a detects the recording sheet 4. If the recording sheet 4 is present, it is then judged whether or not the recording sheet 5 is present (S22). The detection of the recording sheet 5 is performed by the recording sheet detecting sensor 16a. If the recording sheet 5 is also present, a "cut" message requesting a manual cut operation is displayed by the display unit 18 (S31). When the manual cut button is pressed (S32), a cutting operation 1 is effected (S33), and a cutting operation 2 is successively effected (S34).

Figures 1, 10:
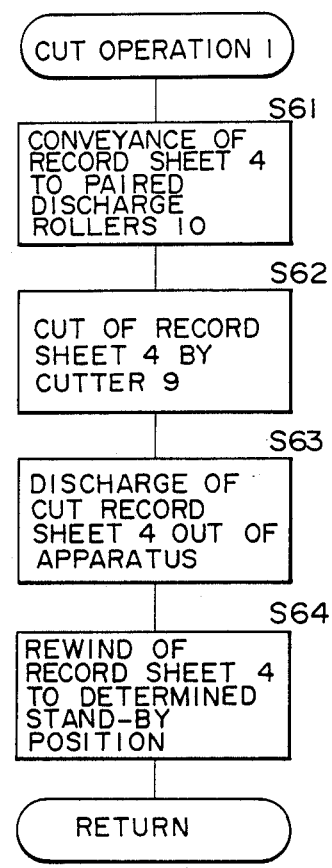
Figures 2, 10:
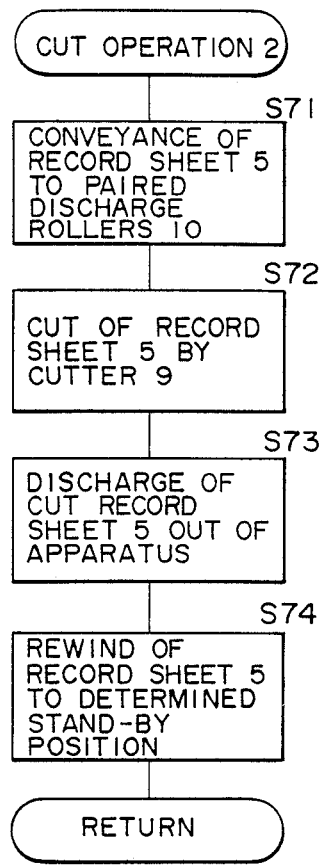

The cutting operation 1 is performed in the way shown in FIG. 10-1, while the cutting operation 2 is performed in the way shown in FIG. 10-2. After the cutting operations, the "cut" message is eliminated (S35), and the recording sheets stand-by.

The cutting operation 1 is performed in the following way. The recording sheet 4 is conveyed to the paired discharge rollers 10 (S61), a portion of the recording sheet 4 at the forward end thereof is cut by the cutter 9 (S62), the thus cut portion of the recording sheet 4 is discharged to the outside of the apparatus (S63), and the recording sheet 4 is rewound until its leading end is positioned at a predetermined stand-by position (S64). The program then returns. On the other hand, the cutting operation 2 (in the step 34) is performed in the following way. The recording sheet 5 is conveyed to the paired discharge rollers 10 (S71), a portion of the recording sheet 5 at the forward end thereof is cut by the cutter 9 (S72), the cut portion of the recording sheet 5 is discharged to the outside of the apparatus (S73), and the recording sheet 5 is rewound until its leading end is positioned at a predetermined stand-by position (S74). The Referring to FIG. 9, if it is determined in the steps 21 and 22 that the recording sheet 4 is present but the recording sheet 5 is not present, a massage requesting a manual cutting operation is displayed (S41). When the manual cut button 17 is activated (S42), a cutting operation 1 alone is effected (S43), and then the "cut" message is eliminated (S35). In the step 43, the same cutting operation as that shown in FIG. 10-1 is performed. If it is judged in the steps 21 and 23 that the recording sheet 4 is not present but the recording sheet 5 is present, a message requesting a manual cutting operation is displayed (S51). When the manual cut button 17 is activated (S52), a cutting operation 2 is effected (S53), and then the "cut" message is eliminated (S35). The cutting operation 2 effected in the step 53 is the cutting operation shown in FIG. 10-2. In this way, when only one of the recording sheets is present, the cutting operation is performed only with respect to the recording sheet that is present.

On the other hand, if it is judged in the steps 21 and 23 that neither the recording sheet 4 nor the recording sheet 5 is present, the display unit 18 does not display a massage requesting a manual cutting operation, but it displays a massage requesting the check of the recording sheets. If such is the case, even when the manual cut button 17 is pressed, no operation starts.

The recording sheet detecting sensor may be, for instance, a sensor of the reflection type. The recording sheet may be, for instance, a sheet of recording paper, a sheet of plastic, or a sheet of ordinary paper. In addition, the present embodiment may be applied to not only a recording apparatus which performs recording by a heat-sensitive type method but also to an apparatus which performs recording by another method such as the so-called thermal transfer type method employing an ink sheet. Further, the platen is not limited to the roller type; instead, it may be the type formed of a flat plate.

This embodiment of the present invention provides the effect of ensuring that the leading end of each of the recording sheets stands by at the correct positions.

Further embodiments of the present invention will now be described with reference to FIGS. 11 to 20.

A further embodiment of the present invention provides a recording apparatus adapted to accommodate first and second recording sheets rolled into a plurality of rolls, selectively convey one of the first and second recording sheets to a recording section having a recording head, and record an image in accordance with image information on the selected recording sheet. This recording apparatus has recording sheet detecting sensors for detecting the the first and second recording sheets, and initialization means adapted to determine the position of the leading end of each of the recording sheets on the basis of the outputs of the recording sheet detecting sensors, cut off portions of the recording sheets at the leading ends thereof alternately, and initialize the positions of the recording sheets. With this recording apparatus, in the event that a recording operation is abnormally stopped and a different one of the recording sheet is selected at the time of resuming recording after the return of the normal condition, recording can be effected positively with respect to the recording sheet on which the information should be recorded, and the recording sheets can be positively kept from getting jammed.

A still further embodiment provides a recording apparatus adapted to accommodate first and second recording sheets rolled into a plurality of rolls, selectively convey one of the first and second recording sheets to a recording section having a recording head, and record an image in accordance with image information on the selected recording sheet. This recording apparatus is capable of storing in a register data on a condition in which the power supply is turned off, a condition in which a cover is open, or a condition in which a recording operation is stopped during recording, capable of initializing the positions of the leading ends of the recording sheets when data on one of the conditions is stored in the register at the start of a recording operation, and capable of erasing the stored data on the conditions from the register. Also with this recording apparatus, in the event that a recording operation is abnormally stopped and a different one of the recording sheet is selected at the time of resuming recording after the return of the normal condition, recording can be effected positively with respect to the recording sheet on which the information should be recorded, and the recording sheets can be positively kept from getting jammed.

Descriptions will now be given with respect to a recording apparatus such as a facsimile apparatus embodying these further embodiments of the present invention. The block diagram shown in FIG. 8 generally illustrates these embodiments. More specifically, the apparatus has a CPU 50, an NCU (network control unit), MODEM 52, DATA CONT 53, MODEM CONT 54, a ROM 55 in which programs as shown in FIGS. 16 to 20 are set, a RAM 56 which has a register described later and which also acts as an element for operation, OPERATION CONT 61, I/O 62, DRIVE CONT 63, DRIVER 64, and RECORD CONT 65, a manual cut button 17 operated by the operator to initialize the positions of the leading ends of the recording sheets, and a display unit 18. The apparatus also has recording sheet width detecting sensors 13b and 16b for detecting the width of recording sheets 34a and 34b, a cover switch 70 for detecting the opened-closed condition of a main body cover (e.g. a component corresponding to the second casing B), and a recording head 33.

The CPU 50 acts as an example of a means to initialize the positions of the leading ends of the recording sheet 34a and 34b when data on a condition in which the power supply is turned off, a condition in which the cover is open, or a condition in which a recording operation is stopped during recording is stored in the register at the start of a recording operation. This CPU 50 also acts as an example of a means to erase the stored data on the above-mentioned conditions from the register after the positions of the leading ends of the recording sheets 34a and 34b have been initialized. The RAM 56 includes a register 57 for storing therein data on a power supply turned-off condition, a cover-opening condition, or a condition in which a recording operation is stopped during recording.

The OPERATION CONT 61 acts to drive the display unit 18 as well as to receive a manual cut command from the manual cut button 17. The I/O 62 receives signals from recording sheet detecting sensor 39a and 39b (each of which may be formed of, for instance, a sensor of the reflection type), and signals from the recording sheet width detecting sensors 13b and 16b. The DRIVER 64 drives a recording motor 36, feed motors 38a and 38b, and a cutter motor 37.

The cover switch 70 acts to detect an open condition of a cover (i.e. the component corresponding to the second casing B). The cover is opened when the recording sheets 34a and/or 34b are to be replaced. This cover may be provided with conveyance rollers, or an original sheet table, in the same way as the second casing B. Alternatively, the cover may be one which simply covers an outer wall or an opening.

Figure 11:
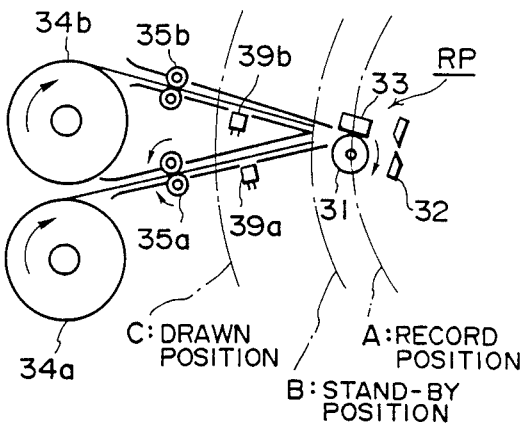
FIG. 11 is a fragmentary sectional view of a recording apparatus embodying further embodiments of the present invention, showing a condition in which both two recording sheets are set at a stand-by position B.

FIG. 11 shows the internal arrangement of the part of the apparatus that is related to the recording.

In FIG. 11, one of the recording sheets 34a and 34b is conveyed to the recording section RP in response to a selection signal from the CPU 50. A predetermined image is recorded on the selected recording sheet by the recording section RP, and the recording sheet on which the image has been recorded is cut on the rear side of the image by a cutter 32. A cut-off portion of the recording sheet is discharged from a discharge port 10a to the outside of the apparatus.

The recording section RP mainly comprises a platen roller 31 for conveying the recording sheet 34a or 34b at a constant speed, and a recording head 33 of the line-type which is capable of coming into pressure-contact with the platen roller 31 to heat the recording sheet formed of a heat-sensitive sheet in accordance with image information (which is either information read by a reader provided on the main body of the apparatus when the apparatus is in the copy mode or information transmitted from an originating facsimile apparatus when the apparatus is in the reception mode). Paired feed rollers 35a convey the recording sheet 34a to the recording section RP, while paired feed rollers 35b convey the recording sheet 34b to the recording section rollers 35a and 35b are individually driven by drive motors 36, 37, 38a and 38b, respectively, as shown in FIG. 4.

The recording sheets 34a and 34b have near-end marks in the vicinity of their respective trailing ends (i.e., in the areas which are about 1 m from the trailing ends). The recording sheet detection sensors 39a and 39b detect these near end marks, besides they detect the presence of the recording sheets.

Next, the normal operation of the apparatus embodying the further embodiments of the present invention will be described.

Image information received from an originating station is passed through the NCU 51, and is demodulated by the MODEM 52 into digital signals which are sent to the DATA CONT 53. The CPU 50 selects one of the recording sheets 34a and 34b in accordance with data obtained from the signals. The following description is given under the assumption that the recording sheet 34a has a width corresponding to that of A-4 size, while the recording sheet 34b has a width corresponding to that of B-4 size.

When image information corresponding in size to, for instance, A-4 is received, the CPU 50 acts to drive the motor 38a so that the paired feed rollers 35a are rotated in the normal direction (i.e., in the directions indicated by the arrows shown in FIG. 11), thereby conveying the recording sheet 34a to the recording section RP. Simultaneously, the recording motor 36 is driven so that the platen roller 31 is rotated in the direction indicated by the arrow shown in FIG. 11.

Subsequently, when the leading end of the recording sheet 34a is conveyed to the recording section RP, the feed motor 38a is turned off, and while the recording sheet 34a is conveyed by the platen roller 31 at a constant speed, the received image information is recorded on the recording sheet 34a by the recording head 33 which generates heat in accordance with the image information. At this time, the paired feed rollers 35a rotate as a result of movement of the recording sheet 34a which is being conveyed.

The CPU 50 controls the feed motors 38a and 38b through the DRIVE CONT 63 and the DRIVER 64 so that the paired feed rollers 35a and the platen roller 31 are rotated in a controlled manner.

The DATA CONT 53 sends information data to the RAM 56 through the data bus. The CPU 50 decodes the information data in the RAM 56, and the thus decoded data is stored again in the RAM 56. When information data for one line is stored in the RAM 56 in this way, the data is sent to the recording head 33 through the RECORD CONT 65, and the recording of the information data in one line is performed. When the data has been recorded in one line the CPU 50 acts to drive the recording motor 36 to rotate the platen roller 31 so that the recording sheet 34a is conveyed by an amount corresponding to another one line.

By repeating the above-described operations, the recording of information on one page is completed.

When the received image information has been recorded, the platen roller 31 conveys the recording sheet 34a until the rear end of the image reaches the cutter 32. When this end reaches the cutter 32, the cutter motor 37 is driven so that the cutter 32 cuts the recording sheet 34a. A portion of the recording sheet on which the recording has performed in this way is discharged to the outside of the apparatus. Simultaneously, the platen roller 31 and the paired feed rollers 35a are rotated in the directions opposite to those indicated by the arrows shown in FIG. 11 so that the recording sheet 34a is rewound until the leading end thereof is positioned at the stand-by position B shown in FIG. 11 (i.e., at a position slightly upstream of the recording section RP), thereby completing the recording of the received image corresponding in size to A-4 size.

During such a recording operation, whether or not the leading end of the recording sheet 34a has been conveyed to the recording section RP, whether or not the rear end of the image has been conveyed to the cutter 32, and whether or not the recording sheet 34a has been rewound until the leading end thereof is positioned at the stand-by position B are detected by counting the number of rotation steps of the feed motor 38a which rotates the paired feed rollers 35a and that of the recording motor 36 which rotates the platen roller 31. When the recording sheet 34a is conveyed to a position corresponding to one of the above-mentioned predetermined positions, the CPU 50 generates a signal which actuates the motors 36 and 38a.

When a received image has a size corresponding to B-4 size, the paired feed rollers 35b, the recording section RP, and the cutter 32 are operated in a similar manner to waht is described above, thereby performing the recording of the image of B-4 size on the recording sheet 34b.

Next, descriptions will be given concerning operations performed in order to detect the leading ends of the recording sheets.

FIG. 11 shows that two recording sheet rolls are accommodated and are in a condition in which either one of the recording sheets is usable, with their leading ends being positioned at the stand-by position B. In the event that a recording operation is abnormally stopped during recording or that a cover (e.g., a component corresponding to the second casing) is open, there are several possible positions of the recording sheets, depending on at which locations the leading ends of the recording sheets are located either downstream of the recording position A or between the recording position A and the stand-by position B, and depending on whether or not the recording sheet detecting sensors 39a and 39b are detecting near-end marks. In the following descriptions, it is assumed that the outputs of these recording sheet detecting sensors 39a and 39b indicate "white" when the recording sheet is present while they indicate "black" when the recording sheet is not present or when the near-end marks are detected.

When the power supply is turned on in the normal operation, the leading ends of the recording sheets 34a and 34b are positioned at the stand-by position B as shown in FIG. 11. However, when the power supply is turned on after a recording operation has been abnormally stopped due to a cut in the power supply, the positions of the leading ends of the recording sheets 34a and 34b are varied.

Figure 16:
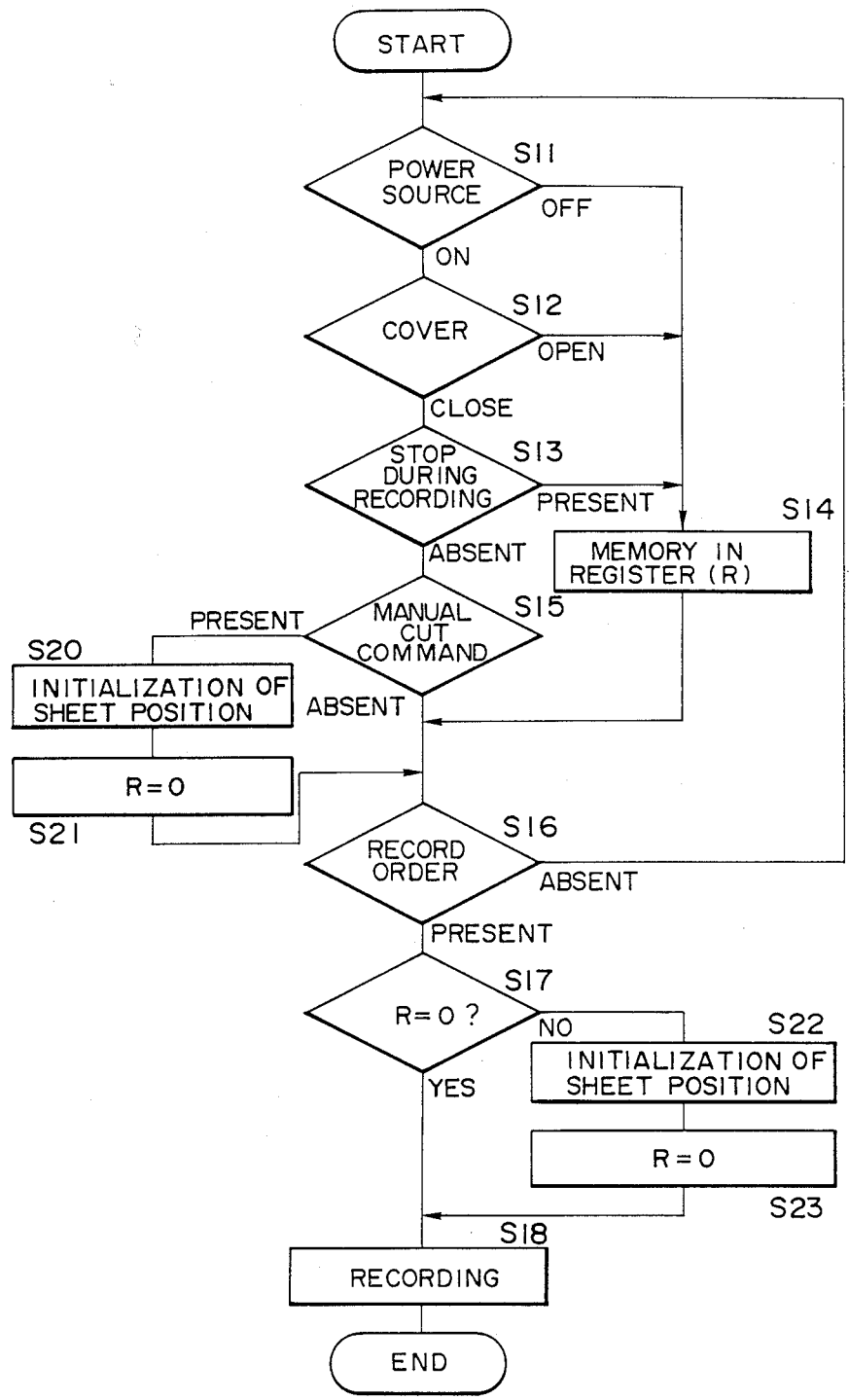
FIGS. 16, 17, 18, 19, and 20 are flowcharts for operation of the apparatus embodying the further embodiments of the present invention.

FIG. 16 is a flowchart showing an example of operation of the apparatus embodying the embodiments of the present invention.

It is first detected whether or not the power supply is turned on (S11). If the power supply is turned on, it is detected whether or not the cover of the recording apparatus is open (S12). If the cover is not open, it is judged whether or not a recording operation has been stopped during recording (S13).

If it is found in the step 11 that the power supply is turned off, the data on the fact that the power supply is turned off is stored in the register 57 within the RAM 56 (S14). The register 57 has 3 bits, for example, and, if the power supply is turned off, the content R of the register 57 is set to 001 (R=001). Similarly, if the cover (e.g., a component corresponding to the second casing B) of the recording apparatus open, or if a recording operation has been stopped during recording, data on the fact is stored in the register 57. For example, if the cover of the recording apparatus is open, the content R of the register 57 is set to 010. If a recording operation has been stopped during recording, the content R of the register 57 is set to 100. Needless to say, the number of bits of the register 57 may be other than 3.

If the conditions that the power supply is turned on, that the cover is closed, and that there was no stop of a recording operation during recording simultaneously stand, and if it is found in the stop 15 that no manual cut command (the command to manually start the initialization of the positions of the leading ends of the recording sheets) is present, the program proceeds to the step 16. In the stop 16, it is judged whether or not a recording order is present, and, if there is no recording order, the program returns to the step 11. On the other hand, if a recording order is present, it is judged whether or not the content R of the register 75 is "all 0" (S17). If it is judged that R=all 0, i.e., if there was no abnormal stop, a recording operation is performed with respect to the selected recording sheet (S18).

If it is found in the step 15 that the manual cut command is present, initialization (described later with reference to FIGS. 16 et seq.) is performed (S20), and the content R of the register 57 is reset at "all 0" (S21). On the other hand, if it is found in the step 17 that the content R of the register 57 is not "all 0", that is, if there was an abnormal stop in the past, after it has been found at the step 16 that there is a recording order, the program proceeds to the step 22 to perform the initialization of the positions of the recording sheets, and this is followed by the step 23 in which the content R of the register 57 is reset at "all 0".

In the initialization of the positions of the leading ends of the recording sheets, portions of the recording sheets which are rolled into rolls may be cut one by one with respect to the rolls. Alternatively, the portions may be cut simultaneously with respect to the plurality of rolls.

The initialization of the positions of the recording sheets, which is performed in the step 20 or 22 will now be described.

FIGS. 17, 18, 19, and 20 are flowcharts showing the operation that is performed to initialize the position of the recording sheets in the apparatus.

Figure 12:
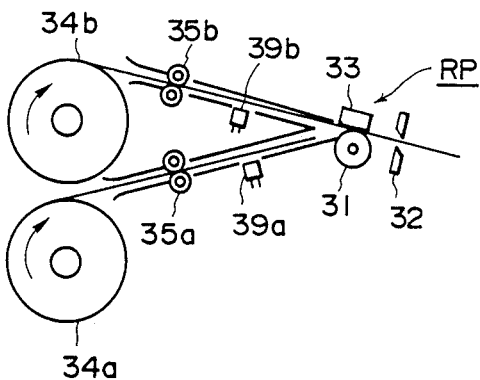
FIGS. 12 and 13 are views corresponding to FIG. 11, showing conditions in which both recording sheet detecting sensors 39a and 39b are detecting "white"
Figure 13:
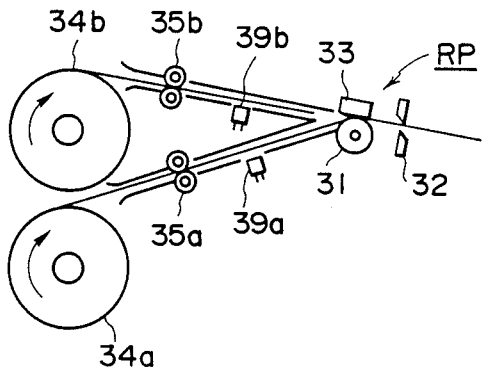
Figure 17:
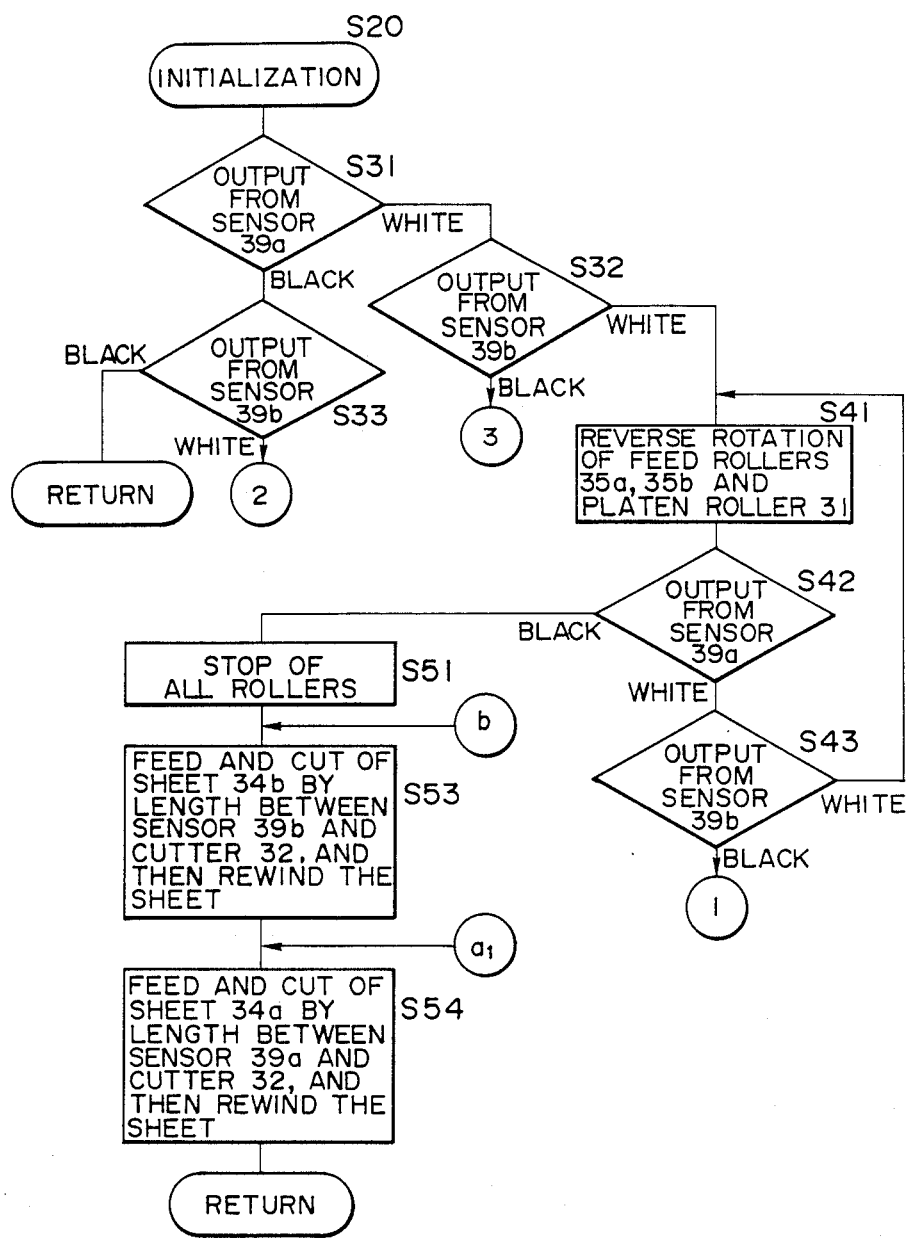

Referring to FIG. 17, if the output from the recording sheet detecting sensor 39a indicates "white" (S31) and simultaneously if the output of the recording sheet detecting sensor 39b also indicates "white" (S32), this means that the apparatus is in one of the conditions shown in FIGS. 11, 12, and 13. FIG. 11 shows a condition in which a recording operation has been stopped with the leading ends of the recording sheets being positioned at the stand-by positions B. FIG. 12 shows a condition in which a recording operation has been stopped during recording on the recording sheet 34b, while FIG. 13 shows a condition in which a recording operation has been stopped during recording on the recording sheet 34a.

If the apparatus is in one of these conditions, the paired feed rollers 35a and 35b and the platen roller 31 are rotated in the reverse direction (S41), thereby rewinding both the recording sheets 34a and 34b, and this rewinding continues either until the output of the recording sheet detecting sensor 39a becomes "black" (S42) or until the output of the recording sheet detecting sensor 39b becomes "black" (S43).

If it is first detected that the output of the recording sheet detecting sensor 39a has become "black", since this means that at least the recording sheet 34a is not on the platen roller 31, it is judged that the apparatus is in the condition shown in FIG. 11 or FIG. 12. Therefore, the initialization operation is first effected with respect to the recording sheet which not the recording sheet that is not on the platen roller, that is, with respect to the recording sheet 34b.

Namely, rotation of all the rollers is stopped (S51). The recording sheet 34b is fed by a length corresponding to the length between the recording sheet detecting sensor 39b and the cutter 32, is cut in the thus-fed condition, and is rewound until the leading end thereof is positioned at the stand-by position B (S53). Subsequently, the initialization operation is effected with respect to the recording sheet 34a. Namely, the recording sheet 34a is fed by a length corresponding to the length between the recording sheet detecting sensor 39a and the cutter 32, is cut in the thus-fed condition, and is rewound until the leading end thereof is positioned at the stand-by position B (S54).

In this way, the initialization is first effected with respect to the recording sheet that is not the recording sheet corresponding to the recording sheet detecting sensor that first detects "black" and, subsequently, the initialization is effected with respect to the remaining recording sheet. By virtue of effecting the initialization in this way, initialization of the positions of the recording sheets can be positively performed while reducing the number of operations required.

Figure 18:
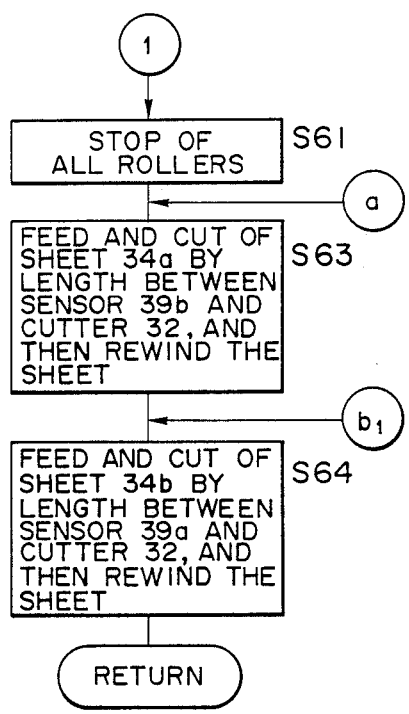

FIG. 18 is a flowchart showing operation which is performed if the output of the recording sheet detecting sensor 39b first becomes "black" in the step 43 shown in FIG. 17.

The operations performed according to this flowchart shown in FIG. 18 comprises steps 61 to 64 which corresponds to the steps 51 to 54 shown in FIG. 17; "the recording sheet 34a", "the recording sheet 34b", "the sensor 39a", and "the sensor 39b" shown in FIG. 17 should respectively be read "the recording sheet 34b", "the recording sheet 34a", "the sensor 39b", and "the sensor 39a" in FIG. 18. The apparatus is in the condition in which at least the recording sheet 34b is not on the platen roller 31 and, hene, is in one of the conditions shown in FIGS. 11 and 13. Therefore, the initialization is first effected with respect to the recording sheet 34a. The steps 61 to 64 shown in FIG. 18 are effected in this way.

Figure 19:
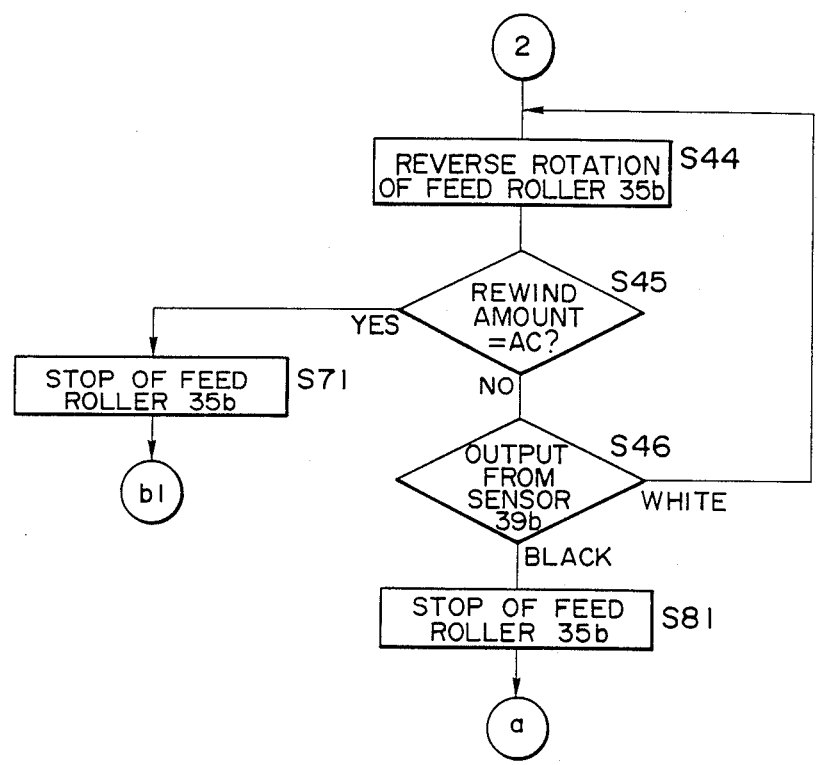

FIG. 19 is flowchart showing initialization operation which is performed if the recording sheet detecting sensors 39a and 39b detects "black" and "white" respectively.

Figures 1, 14:
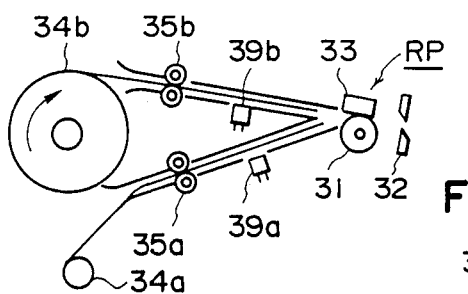
Figures 2, 14:
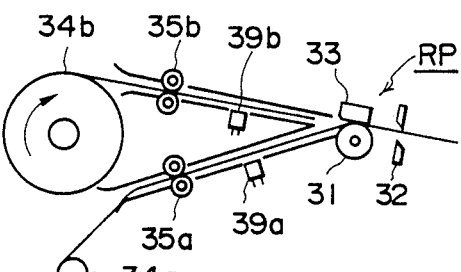
Figures 3, 14:
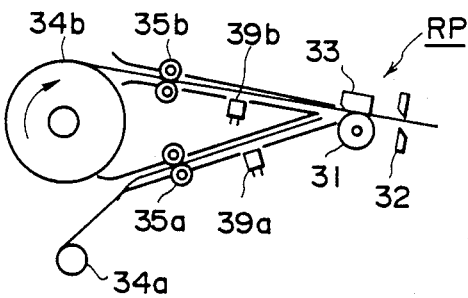
Figures 4, 14:
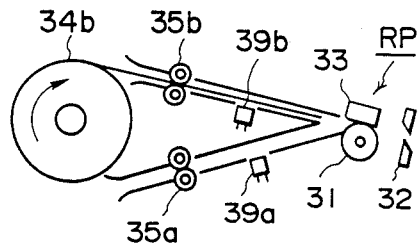
Figures 5, 14:
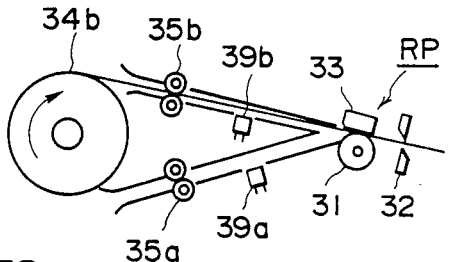

In this case, the apparatus is in one of the five conditions shown in FIGS. 14-1 to 14-5. FIG. 14-1 shows a condition in which the leading ends of the recording sheets are at the strand-by positions and the near-end mark on the recording sheet 34a is detected by the sensor 39a. FIG. 14-2 shows a condition in which the apparatus has been abnormally stopped during recording on the recording sheet 34a while the near-end mark on the recording sheet 34a is detected. FIG. 14-3 shows a condition in which the apparatus has been abnormally stopped during recording on the recording sheet 34b while the near-end mark on the recording sheet 34a, the leading end of which is at the stand-by position, is detected. FIG. 14-4 shows a condition in which the apparatus has been abnormally stopped while the recording sheet 34b alone is set with its leading end being positioned at the stand-by position. FIG. 14-5 shows a condition in which the apparatus has been abnormally stopped during recording on the recording sheet 34b which is the only recording sheet that is set.

Referring to FIG. 19, only the paired feed rollers 35b are reversely rotated (S44) so as to rewind the recording sheet 34b by a rewinding amount AC (which corresponds to the length between the recording position A and the drawn position C), until the output of the recording sheet detecting sensor 39b becomes "black" (S45, S46). If the recording sheet detecting sensor detects "black" before the recording sheet 34b has been rewound by the rewinding amount AC (S46), the paired feed rollers 35b are stopped (S81) at this moment.

If such is the case, since this means that at least the recording sheet 34b is not on the platen 31, it is judged that the apparatus is in one of the conditions shown in FIGS. 14-1, 14-2, and 14-4. Therefore, the initialization of the positions of the leading ends of the recording sheets is effected with respect to both the recording sheets 34a and 34b. That is, the program returns to the step 63 shown in FIG. 18 to effect the initialization first with respect to the recording sheet 34a and thereafter with respect to the recording sheet 34b. Even when the recording sheet 34a is not set as shown in FIG. 14-4, the cutting operations are effected as a matter of form.

Referring to FIG. 19, if the recording sheet 34b has been rewound by the rewinding amount AC with the output of the recording sheet detecting sensor 39b remaining "white" (S45), the paired feed rollers 35b are stopped (S71). If such is the case, since this means that the recording sheet 34b is on the platen 31, the apparatus is in one of the condition shown in FIGS. 14-3 and 14-5. Therefore, the initialization is effected with respect to only the recording sheet 34b. That is, the program returns to the step 64 shown in FIG. 18.

Figure 20:
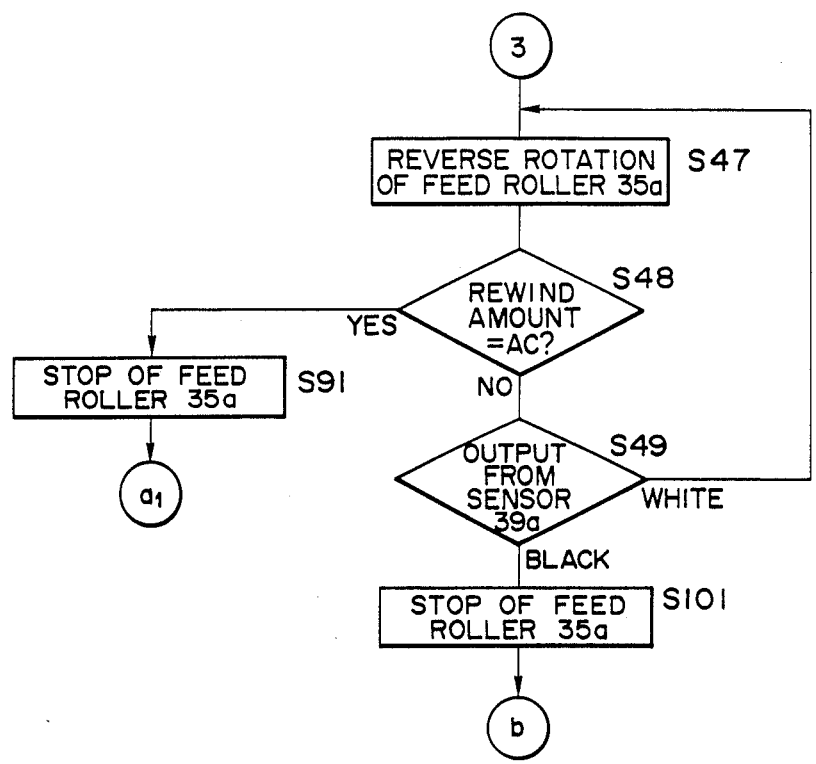

FIG. 20 is a flowchart showing initialization operation which is performed if the recording sheet detecting sensors 39a and 39b detects "white" and "black" respectively.

Figures 1, 15:
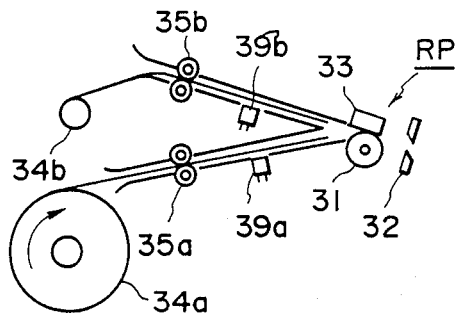
Figures 4, 15:
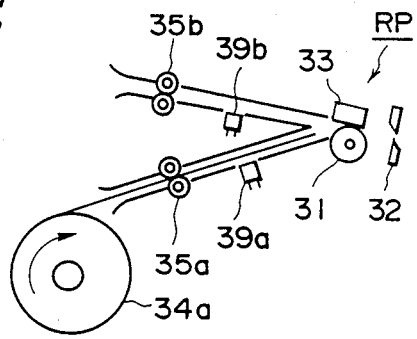
Figures 2, 15:
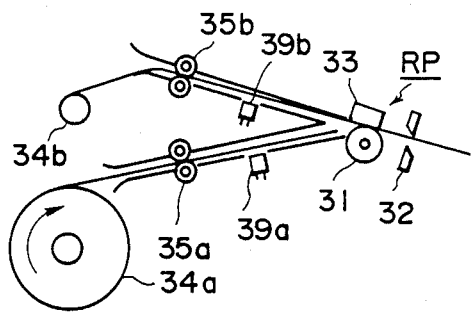
Figures 5, 15:
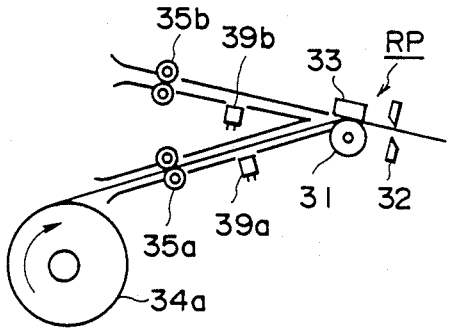
Figures 3, 15:
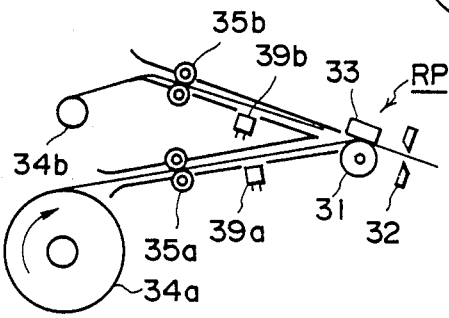

In this case, the apparatus is in one of the five conditions shown in FIGS. 15-1 to 15-5. FIG. 15-1 shows a condition in which the apparatus has been abnormally stopped while the leading ends of the recording sheets are at the stand-by positions and the near-end mark on the recording sheet 34b is detected. FIG. 15-2 shows a condition in which the apparatus has been abnormally stopped during recording on the recording sheet 34b while the near-end mark on the recording sheet 34b is detected. FIG. 15-3 shows a condition in which the apparatus has been abnormally stopped during recording on the recording sheet 34a while the near-end mark on the recording sheet 34b is detected. FIG. 15-4 shows a condition in which the apparatus has been abnormally stopped while the recording sheet 34a alone is set with its leading end being positioned at the stand-by position. FIG. 15-5 shows a condition in which the apparatus has been abnormally stopped during recording on the recording sheet 34a which is the only recording sheet that is set.

Referring to FIG. 20, only the paired feed rollers 35a are reversely rotated (S47) until the rewinding amount reaches the rewinding amount AC. If, during this rewinding, the output of the recording sheet detecting sensor 39a becomes "black" (S49), the paired feed rollers 35a are stopped (S101) at this moment. If such is the case, since this means that at least the recording sheet 34a is not on the platen 31, it is judged that the apparatus is in one of the conditions shown in FIGS. 15-1, 15-2, and 15-4. Therefore, the initialization of the positions of the leading ends of the recording sheets is effected with respect to both the recording sheets 34a and 34b. That is, the program returns to the step 53 shown in FIG. 17 to effect the initialization first with respect to the recording sheet 34b and thereafter with respect to the recording sheet 34a.

Referring to FIG. 19, if the recording sheet 34b has been rewound by the rewinding amount AC with the output of the recording sheet detecting sensor 39a remaining "white" (S48), the paired feed rollers 35a are stopped (S91). If such is the case, since this means that the recording sheet 34a is on the platen 31, the apparatus is in one of the condition shown in FIGS. 15-3 and 15-5. Therefore, the initialization is effected with respect to only the recording sheet 34a. That is, the program returns to the step 54 shown in FIG. 17.

In the initialization operations, if it is found in the steps 31 and 33 that both the outputs of the recording sheet detecting sensors 39a and 39b indicate "black", this means that neither the recording sheet 34a nor the recording sheet 34b can be used. Therefore, the program returns without effecting the initialization.

The recording sheet may be, for instance, a sheet of recording paper, a sheet of plastic, or a sheet of ordinary paper. In addition, although in the foregoing embodiments, the present invention is applied to a recording apparatus which performs recording by a heat-sensitive type method, this is not limitative. Instead, the present invention may be applied to an apparatus which performs recording by another method such as the so-called thermal transfer type method employing an ink sheet.

With a recording apparatus embodying the two last-mentioned embodiments of the present invention which is capable of accommodating a plurality of rolls formed of rolled recording sheets, in the event that a recording operation is abnormally stopped due to the turning-off of the power supply or the like and a different one of the recording sheet is selected at the time of resuming recording after the return of the normal condition, recording can be effected positively with respect to the recording sheet on which the information should be recorded, and the recording sheets can be positively kept from getting jammed.

As described above, according to the present invention, there is provided a recording apparatus which has improved operability with respect to a plurality of recording sheets which are selectively employed in the recording.

We claim:

1. A recording apparatus for recording an image onto a recording sheet comprising:
    a first mounting section on which a first recording sheet is mountable;
    a second mounting section on which a second recording sheet is mountable;
    a recording section for recording an image onto said first recording sheet and said second recording sheet; and
    first and second sensors provided along a conveyance route of said first and second recording sheet, respectively;
    cutting means for cutting said recording sheets; and
    initializing means for positioning a leading edge of said first and second recording sheets in accordance with said first and second sensors, respectively, whereby said leading edges of said recording sheets are stopped at a predetermined waiting position after each said recording sheet is alternately cut by said cutting means.

2. A recording apparatus according to claim 1, further comprising display means for displaying a message to the operator while a cover over said recording sheets is closed which requests the initialization of the positions of said recording sheets.

3. A recording apparatus according to claim 1, wherein said initialization is effected by a one-time operation of a button.

4. A recording apparatus according to claim 1, comprising a main apparatus body having first and second casings provided openably, sheet holders provided in said first casing for individually receiving two recording sheets each rolled on a roll, feed members provided in said first casing for-conveying to said recording section one of said recording sheets received in the corresponding one of said sheet holders, a cutter provided in said first casing for cutting a recording sheet with respect to which recording has been performed on the rear end of the recorded image, and feed members provided in said second casing for conveying to said recording section the other recording sheet received in the other sheet holder, said recording head which constitutes said recording section being provided on one of said first and second casings, and a platen being provided on the other casing.

5. A recording apparatus according to claim 4, further comprising drive sources provided individually for said cutter, said platen, and said feed members.

6. A recording apparatus according to claim 1, wherein said first and second recording sheets are accommodated side by side.

7. A recording apparatus according to claim 1, wherein the initialization is the operation of making the leading of said recording sheets stand by at a predetermined stand-by position.

8. A recording apparatus according to claim 4, further comprising warning means adapted to request a manual cut operation to the operator when the setting is competed by loading or replacing said recording sheets and then closing said second casing.

9. A recording apparatus according to claim 1, wherein said first and second recording sheets are each wound into a roll-like shape.

10. A recording apparatus according to claim 1, wherein said predetermined waiting position is on a route from said mounting sections to said recording section.

11. A recording apparatus according to claim 1, wherein said predetermined waiting position of said first recording sheet is different from that of said second recording sheet.

12. A recording apparatus according to claim 1, wherein said predetermined waiting position is at a location where said first and second recording sheets are rewound by a predetermined amount from a location where the leading ends of said first and second recording sheets are cut.

13. A recording apparatus according to claim 1, further comprising:
    a register for storing an abnormal state; and
    erasing means for erasing data on said abnormal state from said register after leading ends of said first and said second recording sheets are conveyed to a predetermined waiting position prior to initiation of recording when said abnormal state is stored in said register.

14. A recording apparatus for recording an image onto a recording sheet comprising:

a first mounting section on which a first recording sheet is mountable;

a second mounting section on which a second recording sheet is mountable;

a recording section for recording an image onto said first recording sheet and said second recording sheet;

a first sensor provided along a conveyance route of said first recording sheet for detecting absence or presence of said first recording sheet, a second sensor provided along a conveyance route of said second recording sheet for detecting absence or presence of said second recording sheet, cutting means for cutting said recording sheets; and initializing means for positioning a leading edge of said first and second recording sheets in accordance with said first and second sensors, respectively, whereby said leading edges of said recording sheets are stopped at a predetermined waiting position after each said recording sheet is alternately cut by said cutting means.

15. A recording apparatus according to claim 14, wherein said initialization means is adapted to rewind said first and second recording sheets simultaneously, and first cut one of said recording sheets which is not the recording sheet with respect to which the corresponding recording sheet detecting sensor first detects "black".

16. A recording apparatus according to claim 14, further comprising feed rollers for said recording sheets, said initialization means being adapted to reversely rotate for a predetermined period only the feed rollers corresponding to the one of said recording sheet detecting sensors which is not the recording sheet detecting sensor that detects "black" before the rewinding, and thereafter, when the recording sheet detecting sensor corresponding to those feed rollers detects "white", set the recording sheet corresponding to those feed rollers.

17. A recording apparatus according to claim 14, further comprising feed rollers for said recording sheets, said initialization means being adapted to reversely rotate for a predetermined period only the feed rollers corresponding to the one of said recording sheet detecting sensors which is not the recording sheet detecting sensor that detects "black" before the rewinding, and thereafter, when the recording sheet detecting sensor corresponding to those feed rollers detects "black", cut the recording sheet corresponding to the feed rollers other than those feed rollers and subsequently set the remaining recording sheet.

18. A recording apparatus according to claim 14, wherein the initialization is the operation of making the leading ends of said recording sheets stand by at a predetermined stand-by position.

19. A recording apparatus according to claim 14, wherein said first and second recording sheets are each wound into a roll-like shape.

20. A recording apparatus according to claim 14, wherein said predetermined waiting position is on a route from said mounting sections to said recording section.

21. A recording apparatus according to claim 14, wherein said predetermined waiting position of said first recording to sheet is different from that of said second recording sheet.

22. A recording apparatus according to claim 14, wherein said predetermined waiting position is at a location where said first and second recording sheets are rewound by a predetermined amount from a location where the leading ends of said first and second recording sheets are cut.

23. A recording apparatus for recording an image onto a recording sheet comprising:

a first mounting section on which a first recording sheet is mountable;

a second mounting section on which a second recording sheet is mountable;

a recording section for recording an image onto said first recording sheet and said second recording sheet;

a register for storing an abnormal state; and erasing means for erasing data on said abnormal state from said register after leading ends of said first and said second recording sheets are conveyed to a predetermined waiting position prior to initiation of recording when said abnormal state is stored in said register.

24. A recording apparatus according to claim 23, wherein, when the positions of the leading ends of said recording sheets are initialized, said recording sheets are cut one by one with respect to said plurality of rolls.

25. A recording apparatus according to claim 23, wherein, when the positions of the leading ends of said recording sheets are initialized, said recording sheets are cut simultaneously with respect to said plurality of rolls.

26. A recording apparatus according to claim 23, wherein the initialization is the operation of making the leading ends of said recording sheets stand by at a predetermined stand-by position.

27. A recording apparatus according to claim 23, wherein said first and second recording sheets are wound into a roll-like shape.

28. A recording apparatus according to claim 23, wherein said predetermined waiting position is on a route from said mounting sections to said recording section.

29. A recording apparatus according to claim 23, wherein said predetermined waiting position of said first recording sheet is different from that of said second recording sheet.

30. A recording apparatus according to claim 23, wherein said predetermined waiting position is at a location where said first and second recording sheets are rewound by a predetermined amount from at a location where the leading ends of said first and second recording sheets are cut.

31. A recording apparatus according to claim 23, wherein said abnormal state is a state when the power is turned off, a state when a cover is opened or a state when recording is stopped during recording operation.

* * * * *

UNITED STATES PATENT AND TRADEMARK OFFICE
CERTIFICATE OF CORRECTION

PATENT NO. : 4,868,674
DATED : September 19, 1989
INVENTOR(S) : Mitsunori Nakamura, et al.

It is certified that error appears in the above-identified patent and that said Letters Patent is hereby corrected as shown below:

COLUMN 1:

Line 35, "position" (first occurrence) should be deleted.

COLUMN 2:

Line 7, "sheets jam" should read --sheets may jam--.

Line 13, "is the power supply" should read --power supply is--.

Line 65, "tc" should read --to--.

COLUMN 4:

Line 47, "away" should read --away from--.

UNITED STATES PATENT AND TRADEMARK OFFICE
CERTIFICATE OF CORRECTION

PATENT NO. : 4,868,674  Page 2 of 3
DATED : September 19, 1989
INVENTOR(S) : Mitsunori Nakamura, et al.

It is certified that error appears in the above-identified patent and that said Letters Patent is hereby corrected as shown below:

COLUMN 5:

Line 35, "shaft 8a," should read --shaft 8a'--.

COLUMN 8:

Line 51, "and" should read --and 5--.

COLUMN 9:

Line 23, "The" should read --The program then returns.--.

COLUMN 11:

Line 1, "sheet" should read --sheets--.

Line 56, "section" should read --section RP. The platen roller 31, the cutter 32, the paired feed--.

UNITED STATES PATENT AND TRADEMARK OFFICE
CERTIFICATE OF CORRECTION

PATENT NO. : 4,868,674　　　　　　　　　　　Page 3 of 3
DATED : September 19, 1989
INVENTOR(S) : Mitsunori Nakamura, et al.

It is certified that error appears in the above-identified patent and that said Letters Patent is hereby corrected as shown below:

COLUMN 13:

Line 13, "waht" should read --what--.

COLUMN 15:

Line 51, "the leading" should read --the apparatus has been abnormally stopped while the leading--.

COLUMN 18:

Line 14, "for-conveying" should read --for conveying--.

Signed and Sealed this

Tenth Day of September, 1991

Attest:

HARRY F. MANBECK, JR.

*Attesting Officer*　　　　　*Commissioner of Patents and Trademarks*